(12) United States Patent
Fujii et al.

(10) Patent No.: US 6,225,791 B1
(45) Date of Patent: May 1, 2001

(54) CONTROLLER FOR PERFORMING A DECOUPLING CONTROL OF A TRANSFORMERLESS REACTIVE SERIES COMPENSATOR

(75) Inventors: Toshiyuki Fujii, Tokyo (JP); Andreas Beer, Grüt (CH)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/585,551

(22) Filed: Jun. 2, 2000

(30) Foreign Application Priority Data

Dec. 15, 1999 (EP) ................................. 99124851

(51) Int. Cl.$^7$ ..................................................... G05F 1/70
(52) U.S. Cl. ........................................... 323/207; 323/210
(58) Field of Search .................................. 323/205, 207; 363/41, 43

(56) References Cited

U.S. PATENT DOCUMENTS

| | | | |
|---|---|---|---|
| 4,555,750 | * 11/1985 | Matsumura et al. | 363/37 |
| 4,862,340 | * 8/1989 | Inokuchi | 363/35 |
| 5,198,746 | 3/1993 | Gyugyi et al. | 323/207 |
| 5,329,221 | * 7/1994 | Schauder | 323/207 |
| 5,396,411 | * 3/1995 | Konishi et al. | 363/37 |
| 5,621,305 | * 4/1997 | Clark et al. | 323/210 |
| 5,751,138 | * 5/1998 | Venkata et al. | 323/207 |
| 5,754,035 | 5/1998 | Sen | 323/207 |
| 5,808,452 | * 9/1998 | Gyugyi et al. | 323/207 |
| 5,942,880 | 8/1999 | Akamatsu et al. | 323/210 |
| 6,057,673 | * 5/2000 | Okayama | 323/207 |
| 6,075,349 | * 6/2000 | Okayama | 323/207 |

FOREIGN PATENT DOCUMENTS 0 951 126    10/1999  (EP) .

OTHER PUBLICATIONS

Stemmler et al., "Transformerless Reactive Series Compensators With Voltage Source Inverters", IEEE , 1997, pp. 197–201.
Beer et al., "Hybrid Transformerless Reactive Series Compensators", Proceeding of the 8$^{th}$ European Conference on Power Electronics and Applications (EPE), 1999, pp. 1–10.

* cited by examiner

Primary Examiner—Adolf Deneke Berhane
(74) Attorney, Agent, or Firm—Leydig, Voit & Mayer, Ltd.

(57) ABSTRACT

A controller for generating a modulation signal m applied to a transformerless reactive series compensator connected serially in a power transmission line. A modulation signal generator generates a modulation signal m in the form of m=$m_d$ cos (ωt)−$m_q$ sin (wt). The controller includes a current loop with a current controller outputting the modulation index $m_q$ of the modulation signal m. A voltage control loop including a DC voltage controller outputs the modulation index $m_d$, of the modulation signal m. The current control loop and the voltage control loop are respectively provided for outputting indices $m_q$', $m_d$' in order to control a line current and a DC capacitor voltage of a capacitor of the compensator to reference values. The controller includes a decoupler so that the line controller and the capacitor voltage are independent of the output of the current controller. Therefore, the amplitude of the line current and the magnitude of the DC capacitor voltage can be controlled completely independently from each other, i.e., the control loops are decoupled.

20 Claims, 21 Drawing Sheets

EXAMPLE OF THE INVENTION

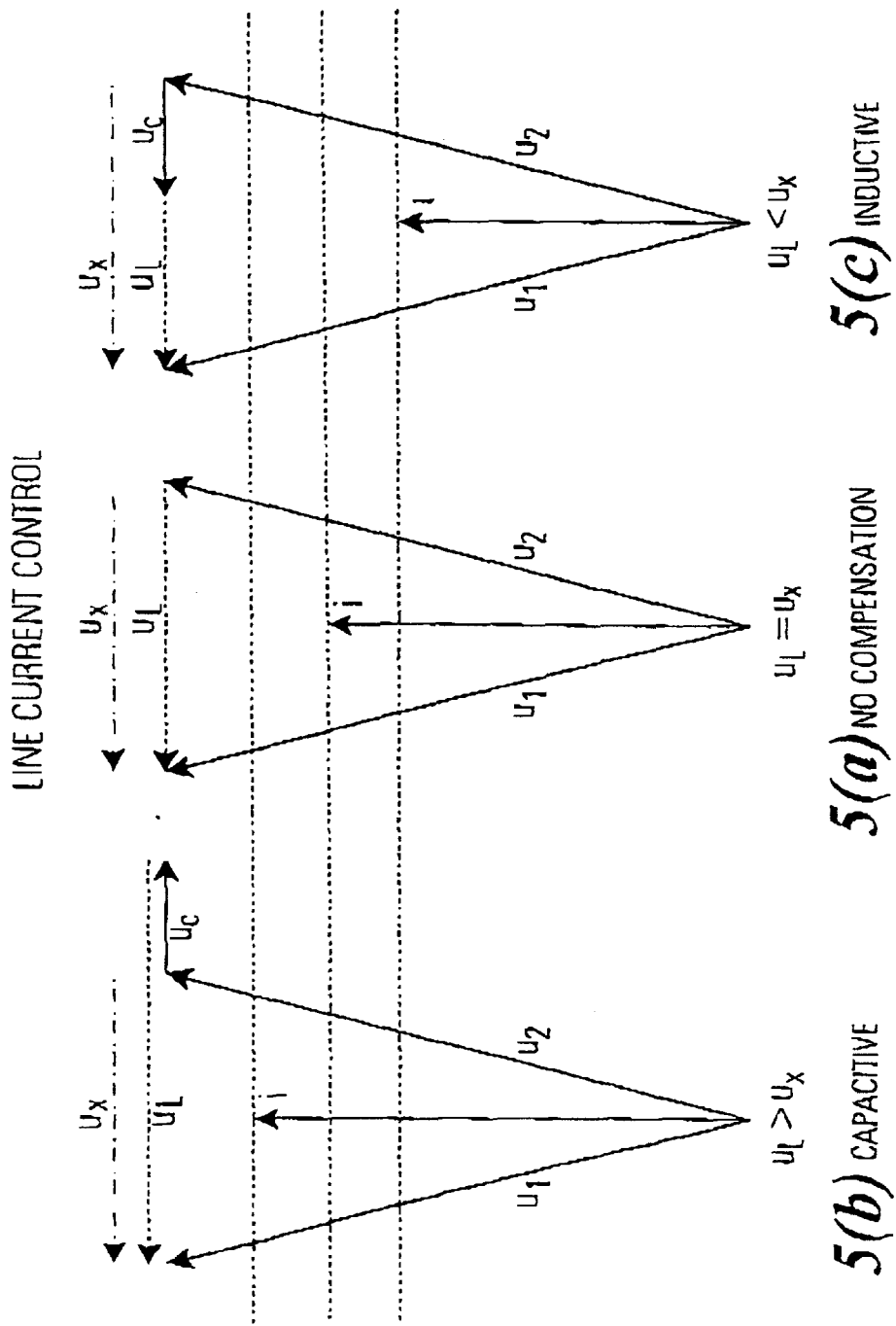

SINGLE PHASE SYSTEM

FIG. 11 PRIOR ART
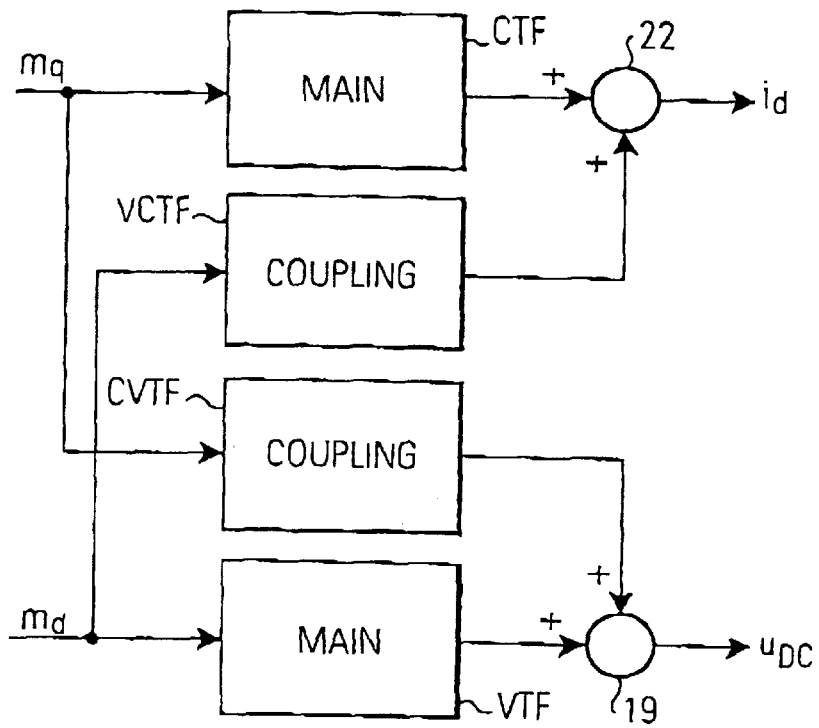
FIG. 13a INVENTION
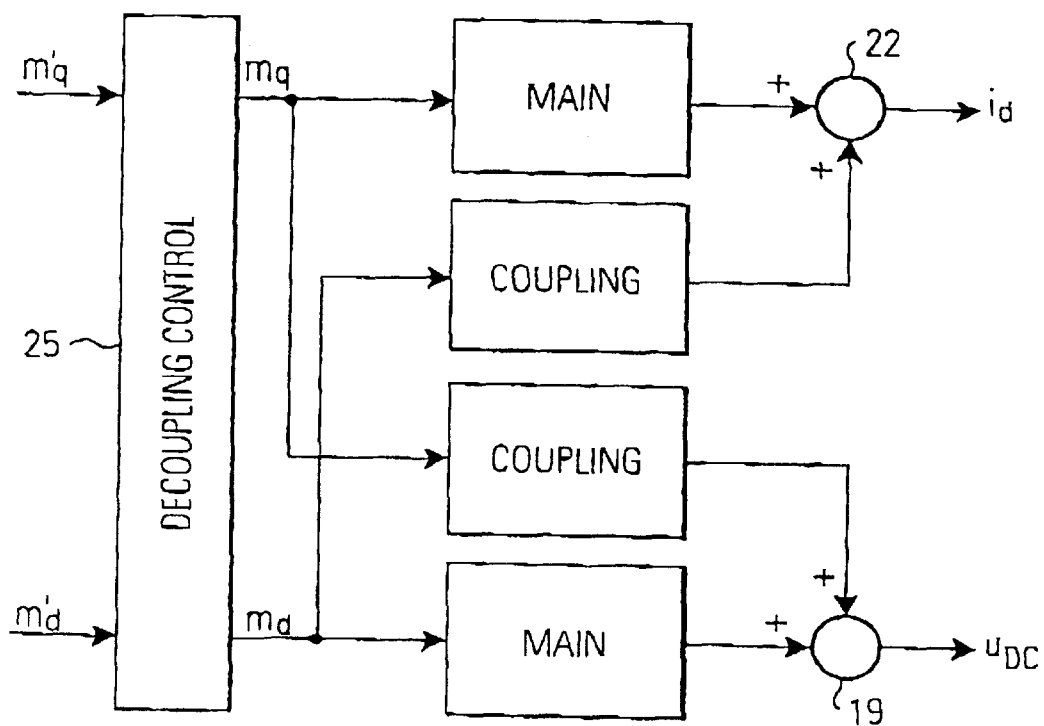

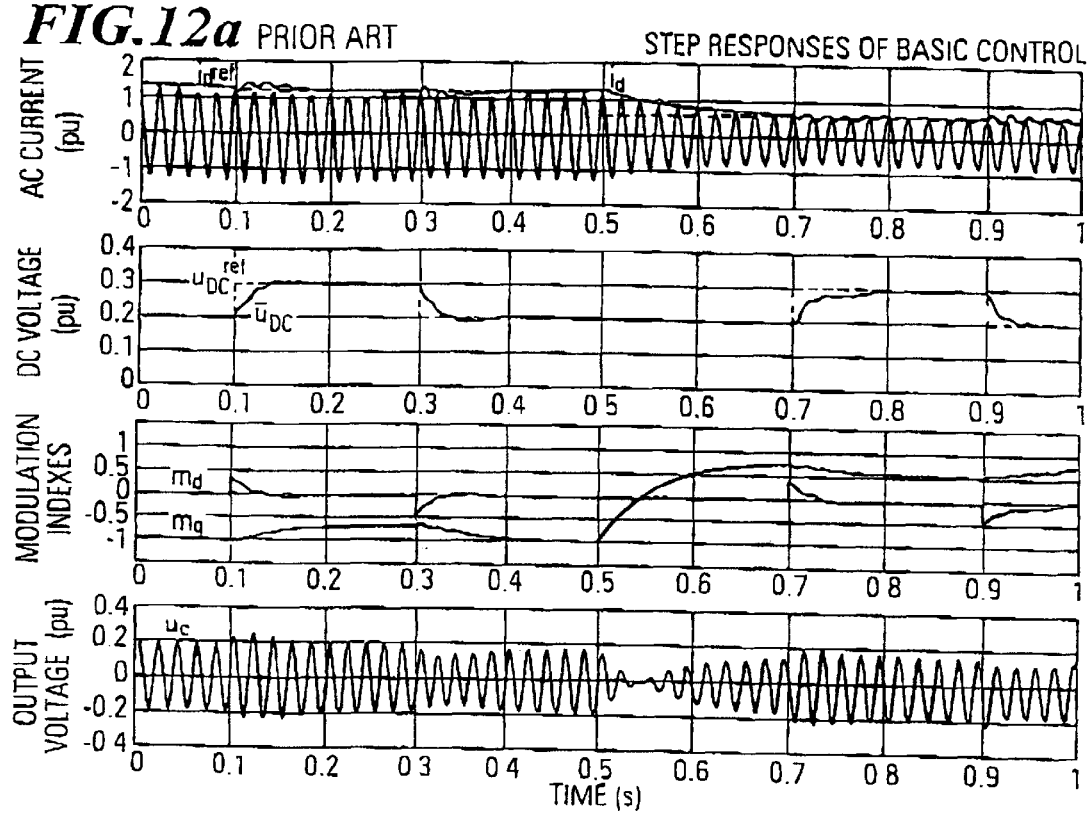
FIG.12a PRIOR ART — STEP RESPONSES OF BASIC CONTROL
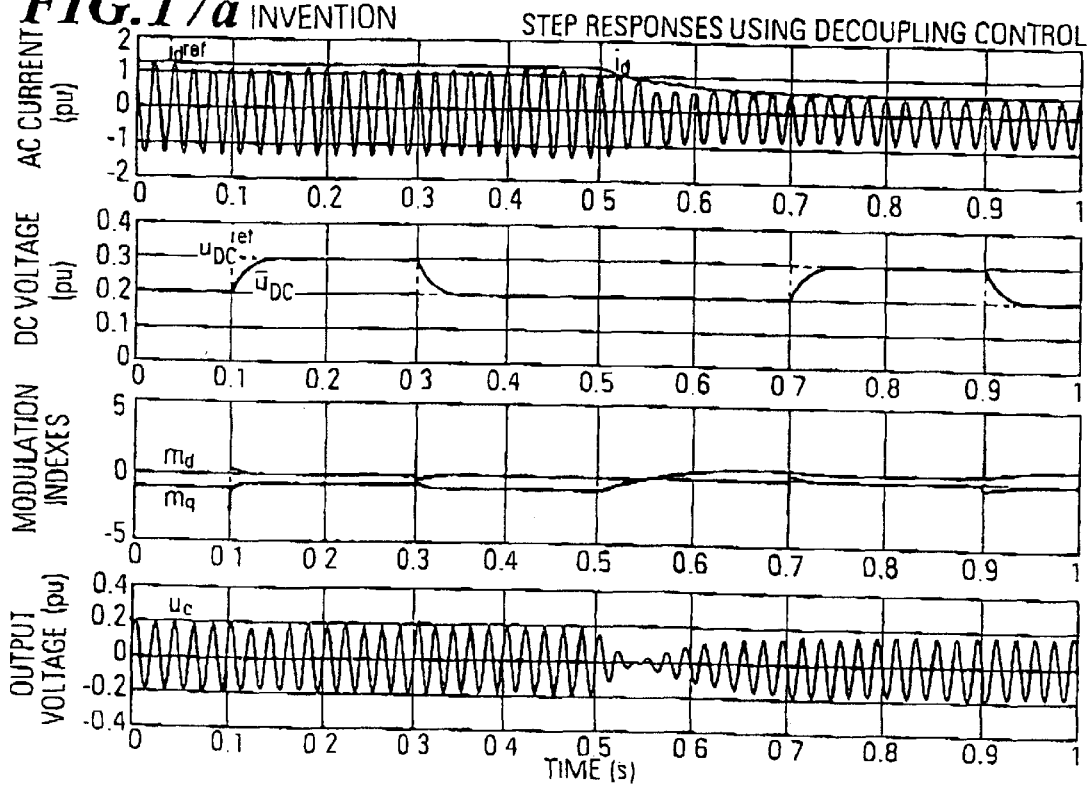
FIG.17a INVENTION — STEP RESPONSES USING DECOUPLING CONTROL

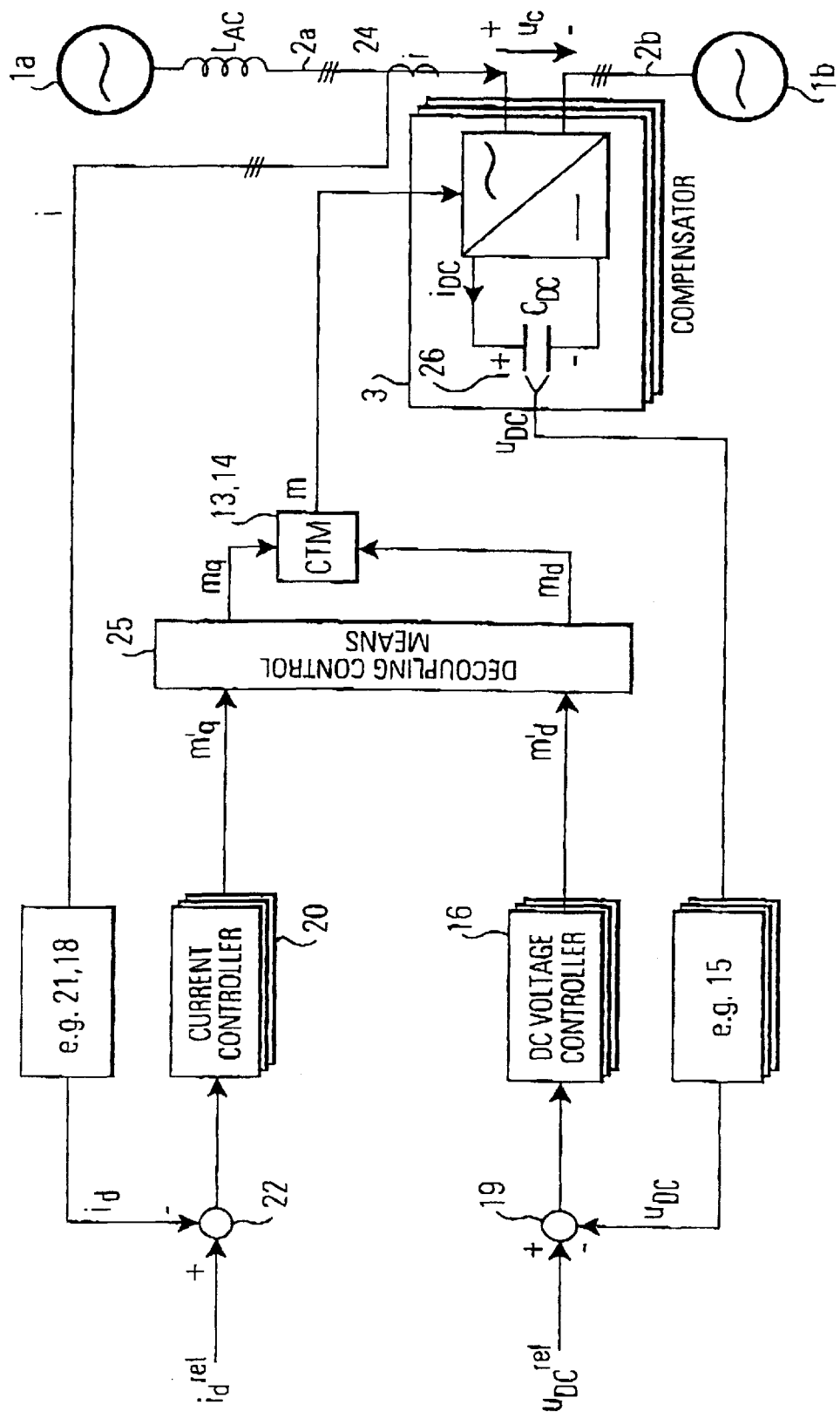
FIG.13b PRINCIPLE OF THE INVENTION

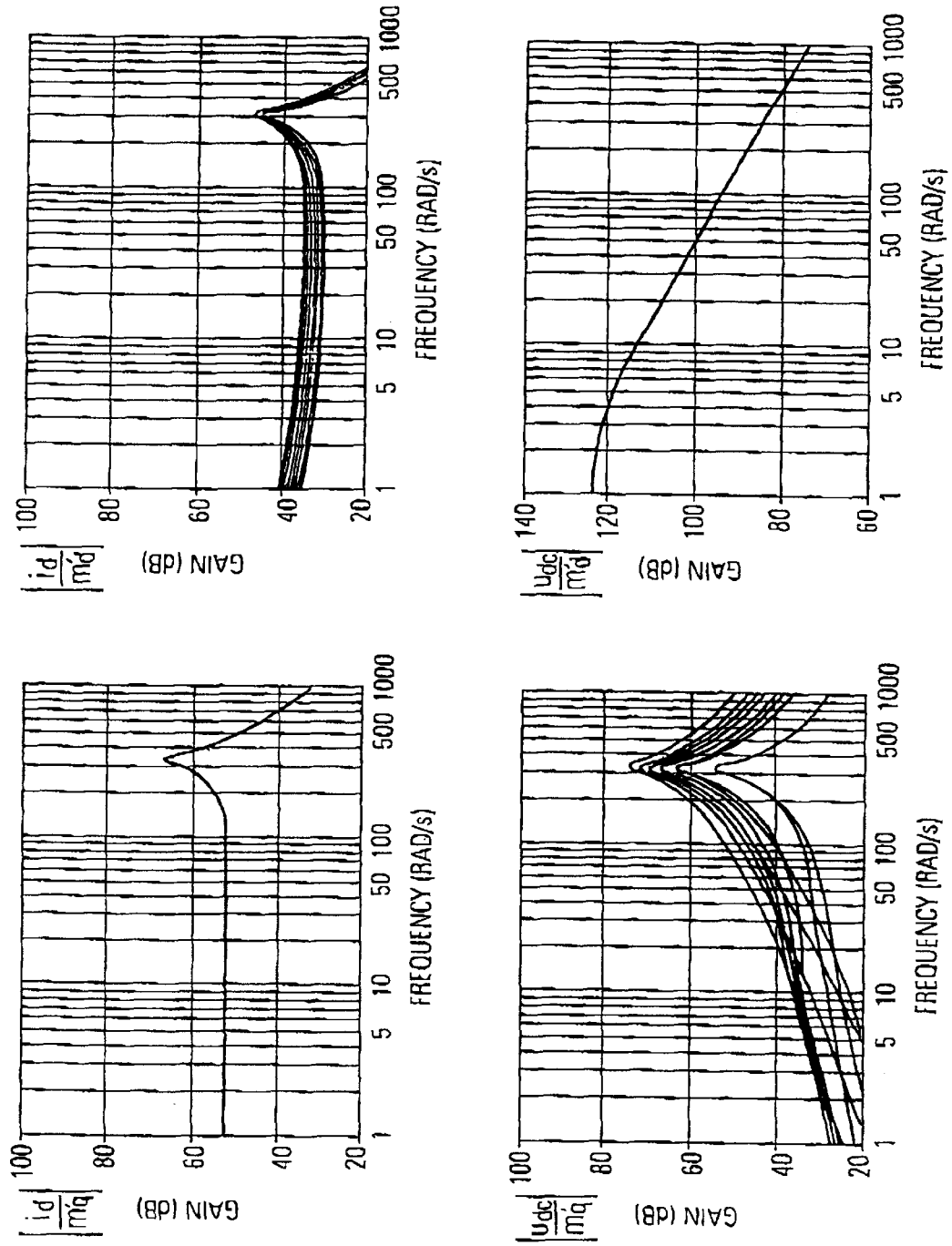
FIG.17b INVENTION
WITH SIMPLIFIED DECOUPLING CONTROL (step2) AT $\Delta\varphi_u = 30$ (deg)

US 6,225,791 B1

CONTROLLER FOR PERFORMING A DECOUPLING CONTROL OF A TRANSFORMERLESS REACTIVE SERIES COMPENSATOR

FIELD OF THE INVENTION

The invention relates to a controller for decoupling control of a transformerless reactive series compensator serially inserted into a power transmission line. Typically, in such a transformerless reactive series compensator inverter control is performed in order to control the line current and/or the voltage applied from the compensator to the transmission line. The voltage/current control enables to control of the power flow from one end to the other end of the transmission line and power flow into the inverter of the compensator in order to charge a capacitor which provides the applied voltage.

Typically, as will be explained with more details below, a current feedback control loop and a voltage feedback control loop are employed in order to respectively control the reactive and active part of the line current. For doing so a modulation signal, based on which the Pulse Width Modulator (PWM) control of the inverter is performed, is a sinusoidal signal of a particular phase. Adjusting the amplitude and the phase of the modulation signal allows to perform the power control.

However, due to the coupling of the current and the voltage on the line, the current and voltage feedback control loops are not independent from each other, i.e. the output control signal of the voltage controller influences the measured current. Similarly, the current control value output by the current controller influences the measured voltage. The controller of the present invention is particularly provided in order to allow independent control of current and voltage, i.e. so that signals in the current feedback control loop and signals in the voltage feedback control loop do not influence each other.

BACKGROUND OF THE INVENTION

Recently, power electronics equipments for flexible AC power transmission systems (FACTS) have been investigated and applied to practical systems. A transformerless reactive series compensator is one of these equipments and is effective to perform a power flow control as was explained above. Since the transformerless reactive series compensator does not comprise a transformer its size is small and it can be advantageously used.

FIGS. 1a and 1b respectively show a typical configuration of a power transmission system comprising two AC power systems 1a, 1b coupled to each other through power transmission lines 2a, 2b having a respective inductance $L_{AC}$ and resistance $R_{AC}$. As indicated in FIG. 1a and FIG. 1b, the power transmission system may be a single phase system or a three-phase system. Whilst in the single phase system only one series compensator 3 need to be provided, in the three-phase system a plurality of series compensators 3 are respectively serially inserted as shown in FIG. 1b. Reference numerals 3a, 3b respectively show the terminals at which the respective series compensator (or compensators) are serially inserted.

As shown in FIG. 2, a typical series compensator 3 comprises a starting switch 4, a filter 12, an inverter 7, a DC capacitor $C_{DC}$, a control means C, a saw-tooth generator 10 and a modulation signal generation means 11. The inverter 7 comprises four thyristors 5a, 5b, 5c, 5d respectively controlled by a PWM control signal $SW_{5a}$, $SW_{5b}$, $SW_{5c}$, $SW_{5d}$ output by the control means C.

Whilst the expression "thyristor" is usually a device whose turn-off is not controllable, in FIG. 2, since PWM is used for the inverter, a gate turn-off type thyristor is employed. Since a GTO (gate turn-off thyristor), a GCT (gate commutated thyristor) and an IGBT (insulated gate bipolar transistor) are also generally possible for operating as the kind of switching power device in FIG. 2, hereinafter it is assumed that the expression "thyristor" comprises all such switching power devices.

Each thyristor has connected anti-parallelly thereto a diode 6a, 6b, 6c, 6d. The filter 12 comprises two reactors 9b, 9a and a capacitor 8 for filtering higher order harmonics which are generated by the PWM control of the inverter 7. The filter terminals are connected to the respective interconnections of the thyristors 5a, 5b and of the diodes 6a, 6b and the thyristors 5c, 5d and the diodes 6c, 6d. The DC capacitor $C_{DC}$ is connected at the other terminals of the thyristors and the diodes.

The circuit configuration of the series compensator 3 is conventional and is for example described in the European patent applications EP 98 116 096.3 and EP 98 106 780.4 by the same applicant. These two patent applications in particular describe the start and stop control of the series compensator 3.

A PWM control of the inverter 7 is carried out as principally shown in the diagram of FIG. 3. A modulation signal generation means 11 in FIG. 2 generates a sinusoidal modulation signal m and the saw-tooth generator 10 outputs two saw-tooth carrier signals cs1, cs2. A PWM control signal $SW_{5a}$, $SW_{5d}$ is generated by comparing the modulation signal m with the respective carrier signal cs1, cs2. That is, when the modulation signal amplitude is larger than the carrier signal cs1 amplitude, then the PWM switching signal $SW_{5a}$ is on and it is off if the modulation signal amplitude is smaller. Similarly, if the amplitude of the modulation signal is larger than the inverted carrier signal cs2, then the other PWM switching signal $SW_{5d}$ is switched from ON to OFF. The PWM signals $SW_{5a}$, $SW_{5d}$ are used to trigger the thyristors 5a, 5d. It should be noted that a similar control applies to the thyristors 5b, 5c which is, however, not described here for simplicity.

Assuming that the DC capacitor $C_{DC}$ was charged to $u_{DC}$ the output voltage $u_c$ at the connection terminals 3a, 3d will have a waveform as shown in FIG. 3 in the bottom graph. It will be appreciated that by changing the respective amplitudes of the modulation signal and/or the carrier signal and/or by changing the phase of the modulation signal and/or the carrier signal, different waveforms of the output voltage $u_c$ (hereinafter also called the inverter terminal voltage or compensator output voltage) can be achieved. Comparing FIG. 3 with FIG. 2 it can be seen that essentially the output voltage $u_c$ is the voltage applied to the terminal 3a, 3b.

Whilst from FIG. 3 it only appears as if the terminal voltage $u_c$ changes due to the PWM control of the inverter 7, of course the line current i would also change since current and voltage are linked through the coupling effects due to the line impedance $L_{AC}$. The simultaneous effects of the PWM control on the line voltage and the line current will be explained now.

FIG. 4a shows a summary diagram of the essential parts of FIG. 2 necessary for explaining the current and voltage control. FIG. 4b shows the principle phasor diagram for FIG. 4a. As was the case in FIG. 1a, also in FIG. 4a the compensator 3 is serially connected between the power transmission lines 2a, 2b which are connected to the AC power systems 1a, 1b. For the purpose of explaining the current and the voltage control with respect to their phase relationships it is not necessary to consider explicitly the line impedance $R_{AC}$, although it should be understood that of course the line impedance $R_{AC}$ is also present in FIG. 4a. The inverter control is schematically illustrated with the block to which the reference numeral 7 has been attached. A modulation signal m is applied in order to perform the PWM control. $u_L$ is the voltage occurring as a result of the line impedance $L_{AC}$, i is the line current, $i_{DC}$ is the current flowing through the DC capacitor $C_{DC}$, $u_{DC}$ is the voltage over the DC capacitor $C_{DC}$ and $u_c$ is the output voltage of the series compensator 3. Furthermore, $u_x$ is the overhead voltage which is a difference voltage between the AC sources. For simplicity reasons the leakage conductance in the DC side which could include the switching losses, leakage losses of capacitors and/or losses of DC filters (essentially a parallel resistance to the DC capacitor $C_{DC}$ is not necessary to be considered for the phase relationships.

FIG. 4b shows a principle phasor diagram and the voltages explained with reference to FIG. 4a are shown therein. The compensator 3 can output an output voltage $u_c$ of arbitrary phase with limited amplitude using the DC capacitor voltage $u_{DC}$. FIGS. 5(a), 5(b) and FIG. 5(c) respectively show the cases for no compensation, capacitive operation and inductive operation when controlling the line current i. That is, when the compensator 3 injects a zero voltage $u_c$ into the line, then the inductance voltage $u_L$ is the same as the overhead voltage $u_x$ (FIG. 5(a)). In this case, the line current i flows through the transmission line with a 90° phase lag with respect the inductance voltage $u_L$.

When the compensator 3 injects a capacitive voltage $u_c$ which leads 90° to the line current i, then the inductance voltage $u_L$ increases and therefore also the line current i is increased (FIG. 5(b)).

On the other hand, when the compensator 3 injects an inductive voltage to the line ($u_c$ is in-phase with the inductance voltage $u_L$), the inductance voltage $u_L$ is decreased and therefore also the line current i is decreased (FIG. 5(c)). Thus, the first purpose of the compensator 3 is that the line current i can be controlled (increased/decreased) by the voltage (by the amplitude and the phase of the compensator output voltage $u_c$) output by the compensator 3. Furthermore, of course a skilled person realizes what has been described above for a single phase can be performed in the same manner for a three-phase system.

Of course, the control in FIG. 5 can only be carried out if the DC capacitor $C_{DC}$ has been charged to the predetermined voltage $u_{DC}$ since otherwise no injection of voltage would be possible into the line. Instead of using a battery or another power source, it is advantageous to also control the compensator 3 such that a power flow from the line to the DC capacitor $C_{DC}$ is effected. Such a charging or active power flow from the line to the capacitor is explained with reference to FIG. 6 and FIG. 7.

As mentioned before, a charging of the DC capacitor $C_{DC}$ requires an active power flow from the transmission lines 2a, 2b to the DC capacitor $C_{DC}$ through the inverter 7. In order to take the active power from the power system 1a, 1b, the compensator 3 has to feed the active component of the applied AC voltage $u_c$ to the DC capacitor $C_{DC}$.

In steady state conditions, as already explained with reference to FIG. 5(c) and as shown also in FIG. 6(a), the compensator 3 outputs a reactive voltage $u_c$ which has a 90° difference phase to the line current i. This situation is present in the initial state and the final state of charge control as shown with FIGS. 6(a) and 6(c).

When the compensator 3 outputs the active component in a short duration for taking in active power, the inductance voltage is also changed transiently as shown in FIG. 6(b). The transient inductance voltage includes a di/dt component and a $\omega Li$ component. When the di/dt component is generated, the $\omega Li$ component is influenced. Then, the variation of the $\omega Li$ component influences the di/dt component and the line current fluctuates in an oscillation manner as shown in FIG. 6(b). Consequently, the charging process does not only influence the capacitor voltage but also the line current. The reason is the coupling effect through the line inductance $L_{AC}$ as can be understood from considering the dynamic behavior of the currents and voltages.

Namely, a voltage equation of the inductance $L_{AC}$ can be written as follows.

$$L_{AC}(di/dt)=u_{AC} \tag{1.1}$$

where $L_{AC}$, i and $u_{AC}$ are the line inductance, a line current and the inductance voltage. If a rotational reference frame is introduced whose frequency is $\omega$ in a steady-state condition as $$i=I_d \cos(\omega t)-I_q \sin(\omega t) \tag{1.2}$$

$$u_{AC}=U_d \cos(\omega t)-U_q \sin(\omega t) \tag{1.3}$$

the voltage equation (1.1) can be decomposed in component equations as follows:

$$L(dI_d/dt)=\omega LI_q+U_d \tag{1.4}$$

$$L(dI_q/dt)=-\omega LI_d+U_q \tag{1.5}$$

It can now be understood, as shown in FIG. 6(b) that if $U_d$ (the active part of the applied voltage) is changed, then also $I_d$ (the active part of the current) varies and $I_q$ (the reactive part of the current) is also influenced.

The coupling of a line current control to a DC voltage is illustrated in FIG. 7. A rapid change of the reactive component of the compensator voltage by the line current controls generates a di/dt component of an inductor voltage. Therefore, the line current phasor i moves towards the direction of the change first. Then, the $\omega Li$ component and di/dt component influence each other with the same mechanism but opposite coupling. As a result, the line current has a fluctuation and an active component which is a in-phase component to the compensator voltage. This active component now causes an active power flow from the power transmission line to the DC capacitor $C_{DC}$ in the transient state as shown in FIG. 7(b). However, if the line current is controlled, obviously also the DC voltage is influenced by the line current control.

As can be understood from the above description of FIGS. 4, 5, 6, 7, the main purpose of a controller for the series compensator is to perform a control to increase/decrease the line current as shown in FIG. 5 and to charge the DC capacitor $C_{DC}$ by allowing an active power flow to the DC capacitor $C_{DC}$ as in FIGS. 6, 7. Such controllers will be explained hereinafter.

PRIOR ART OF THE PRESENT INVENTION

FIG. 8 and FIG. 9 show controllers for a single phase and three-phase system, respectively. Such controllers comprising essentially a current loop and a voltage loop are known from "Hybrid transformerless reactive series compensators"

Proceedings of the 8th European Conference on Power Electronics and Applications Conference (EPE)—Lausanne 1999, pages 1–10. The principle control scheme of a single phase system will be explained below with reference to FIG. 8.

The series compensator 3 has the configuration as already explained above with respect to FIG. 2 or 4. It is connected serially into the power transmission lines 2a, 2b at the compensator terminals 3a, 3b. The compensator 3 is controlled by a modulation signal m. A current sensor 24 senses the line current i and a voltage sensor 26 senses the DC capacitor voltage $u_{DC}$.

The following relationship between the currents and voltages exist (where also the line resistance $R_{AC}$ is included) as illustrated with the following equations.

$$L_{AC}\frac{di}{dt} = -R_{AC}i + u_x - u_c \tag{2.1}$$

$$C_{DC}\frac{du_{DC}}{dt} = -G_{DC}u_{DC} + i_{DC} \tag{2.2}$$

Again introducing the reference frame ω in the steady state case as in equation (1.2) and (1.3) leads to:

$$i = i_d \cos \omega t - i_q \sin \omega t \tag{2.3}$$

$$u_c = u_{cd} \cos \omega t - u_{cq} \sin \omega t \tag{2.4}$$

$$u_x = u_{xd} \cos \omega t - u_{xq} \sin \omega t \tag{2.5}$$

Of course, a skilled person realizes that these equations are the same as phasor expressions in the complex plane in the form of e.g. $i = \text{Re}[(i_d + ji_q)e^{j\omega t}]$. Inserting equations (2.3)–(2.5) into equation (2.1), the following equation can be obtained:

$$\left[L_{AC}\frac{di_d}{dt} - \omega L_{AC}i_q\right]\cos\omega t - \tag{2.6}$$
$$\left[L_{AC}\frac{di_q}{dt} + \omega L_{AC}i_d\right]\sin\omega t = [R_{AC}i_d + u_{xd} - u_{cd}]\cos\omega t -$$
$$[R_{AC}i_q + u_{xq} - u_{cq}]\sin\omega t$$

In order to obtain the dynamic equation of the AC current in the rotational reference frame ω the coefficients of the cosine and sine functions are derived:

$$L_{AC}\frac{di_d}{dt} = -R_{AC}i_d + \omega L_{AC}i_q + u_{xd} - u_{cd} \tag{2.7}$$

$$L_{AC}\frac{di_q}{dt} = -R_{AC}i_q - \omega L_{AC}i_d + u_{xq} - u_{cq} \tag{2.8}$$

Equations (2.7) and (2.8) respectively describe the current dynamics. The DC voltage dynamics in equation (2.2) can be related to the AC current dynamics using a balance of power on the AC and DC side. Of course, the output voltage $u_c$ at the output terminals 3a, 3b of the compensator 3 is directly related to the modulation m applied to the inverter 7. Therefore, in principle the output voltage $u_c$ of the compensator 3 has the following relationship with the modulation signal m:

$$u_c = m u_{DC} \tag{2.9}$$

Again introducing the reference frame ω and applying the reference frame also to the modulation signal as $m = m_d \cos(\omega t) - m_q \sin(\omega t)$ the following relationship for the amplitudes must exist:

$$u_{cd} = m_d u_{DC} \tag{2.10}$$

$$u_{cq} = m_q u_{DC} \tag{2.11}$$

Inserting equations (2.10) and (2.11) into equations (2.7) and (2.8) leads to:

$$L_{AC}\frac{di_d}{dt} = -R_{AC}i_d + \omega L_{AC}i_q + u_{xd} - m_d u_{DC} \tag{2.12}$$

$$L_{AC}\frac{di_q}{dt} = -R_{AC}i_q - \omega L_{AC}i_d + u_{xq} - m_q u_{DC} \tag{2.13}$$

Since the instantaneous AC active power of the compensator $p_{AC} = u_c * i$ and the DC power $p_{DC} = u_{DC} * i_{DC}$ must be balanced under the condition of no losses in the converter, the DC current can be written as:

$$i_{DC} = \frac{u_c i}{u_{DC}} = mi = \frac{1}{2}(m_d i_d + m_q i_q) + \Delta \tilde{i}_{DC} \tag{2.14}$$

where $\Delta i_{DC}$ represents the current fluctuation caused by varying the AC power in a single phase. $\Delta I_{DC}$ can be represented as follows:

$$\Delta \tilde{i}_{DC} = \{\tfrac{1}{2}(m_d i_d - m_q i_q)\cos 2\omega t - \tfrac{1}{2}(m_q i_d + m_d i_q)\sin 2\omega t\} \tag{2.15}$$

The DC voltage dynamics can thus be obtained by substituting equation (2.14) into equation (2.2) leading to equation (2.16) as follows:

$$C_{DC}\frac{du_{DC}}{dt} = -G_{DC}u_{DC} + \frac{1}{2}(m_d i_d + m_q i_q) + \Delta \tilde{i}_{DC} \tag{2.16}$$

The above equations in particular equations (2.12) and (2.13) show that the AC current ($i_d$ and $i_q$) and the DC voltage ($u_{DC}$) can indeed be controlled via the modulation signal ($m_d$ and $m_q$), that is via the modulation indexes $m_d$ and $m_q$. Also equation (2.16) shows that this is possible.

A basic controller consisting of two feedback control loops in a system where one is the AC current amplitude control and another one is the DC voltage control based on the modulation indices as derived with the preceding equations is shown in FIG. 8. Since the reactive series compensator can control only reactive power in steady state and the q-axis component in the AC current is kept zero by a phase locked loop 18, $m_q$ is related to inductive and capacitive voltage and is used for controlling the AC line current amplitude. The DC voltage is controlled by $m_d$ because it is related to active power and is the only available signal at $i_q = 0$ in equation (2.16).

FIG. 8 shows a block diagram of a basic control of the series compensator. This controller consists of the current controller 20 with the amplitude detector 21, the DC voltage controller 16 with the filter 15, the current phase detector (PLL) 18, the coordinate transformation unit 14 and the compensation of a DC voltage fluctuation by the DC voltage fluctuation compensation means 13.

In principle, the controller shown in FIG. 8 performs a control as specified with the above mentioned equations (2.12), (2.13), (2.16). The amplitude detector 21 detects the current amplitude of the line current i as sensed by the current detector 24. Reference numeral 22 designates a subtractor which subtracts the command value $i_d^{ref}$ from the amplitude detector output value $i_d$. Reference numeral 20 designates the current controller, e.g. a PI or PID controller which outputs the real part $m_q$ of the modulation signal.

Reference numeral 15 designates a filter for filtering the second harmonics of the fundamental frequency. Reference numeral 19 designates a subtractor for subtracting the output of the filter 15 from the voltage command $u_{DC}^{ref}$. Reference numeral 16 denotes a DC voltage controller, i.e. a PI or PID controller which outputs the imaginary part $m_d$ of the modulation signal m.

As explained above, reference numeral 18 designates a phase detector (e.g. a phase locked loop PLL) which outputs reference signals sin (ωt), cos (ωt) locked to the phase of the line current i as detected by the current detector 24. As explained above, basically the reactive series compensator 3 outputs a reactive voltage $u_c$ and for this reason somehow the control system needs an input about the phase of the AC line current i. In FIG. 8, in the single phase system, a direct measurement of phase using AC current i is employed. The phase detector 18 is contains a phase locked loop PLL which produces the cosine and sine function of the phase.

Reference numeral 14 designates a coordinate transformation means including a first and second multiplier 14a, 14b for respectively multiplying the real and imaginary parts $m_q$, $m_d$ of the modulation signal m with the reference signals cos (ωt), sin (ωt). Reference numeral 14c designates a subtractor which subtracts the output of the first multiplier 14a from the output of the second multiplier 14b. The output is a modulation signal $m_0$ which is a complex signal.

Reference numeral 13 designates as mentioned before, a DC voltage fluctuation means which includes a multiplier 13a and a divider 13b. The multiplier 13a multplies the output signal from the subtractor 14c with the output from the divider 13b and outputs the modulation signal m. The divider 13b divides the output from the filter 15 by the input of the filter 15. The filter 15 and the unit 13 are optional although their use can advantageously reduce the effect of harmonics.

The above described units form two control loops for the current and the voltage based on the sensed current i and the sensed DC capacitor voltage $u_{DC}$.

The current control loop outputs the q-axis modulation index $m_q$ to control the amplitude of the AC current using a feedback control. The current controller 20 modifies $m_q$ in a positive direction when the measured current amplitude $i_d$ is larger than the reference value to move to a smaller current operating point. When the measured current amplitude $i_d$ is smaller than the reference value, the operation is performed in an opposite direction. Therefore, the subtractor 22 just before the current controller 20 has a negative sign for the reference signal $i_d^{ref}$. The amplitude detector 21 is preferably a peak detector, a rectifier and so on for a single phase compensator.

The voltage controller 16 on the other hand outputs the active component $m_d$ of the modulation signal m for controlling the DC voltage of the compensator 3. When the DC voltage goes down, the voltage controller 16 will increase $m_d$ such that the active power component of the AC voltage of the compensator 3 increases and a power influx from the AC system into the DC capacitor is effected. When the DC voltage $u_{DC}$ increases, $m_d$ will be modified by the DC voltage controller 16 in a negative direction. There is a fluctuation which has two times the fundamental frequency in the DC voltage caused by varying of a single phase AC power in one cycle. To reduce the fluctuation in the controller, the detection filter 15 can preferably be provided, because this frequency is normally much higher than the dominant frequencies of the voltage control loop.

The phase detector 18 detects or follows the phase of the AC current i in order to provide one reference sinusoidal signal sin (ωt) in phase and another one cos (ωt) orthogonal to the AC current. In FIG. 8 cos (ωt) is the reference signal in phase and sin (ωt) is the 90° difference signal.

When $m_q$ and $m_d$ are output from the current and voltage control loop, the combiner 14, i.e. the coordinate transformation means, transforms $m_d$ and $m_q$ to a single phase AC modulation signal. In this case $m_q$ is the 90° advanced component to the AC current, such that the subtraction in the transformation has a minus sign for $m_q$ sin (ωt).

As explained above, a DC voltage fluctuation compensation means 13 is provided downstream of the coordinate transformation means 14. For the single phase AC/DC converters, the DC power fluctuation has two times the fundamental frequency of the AC power transmission system. In addition, the output AC voltage of the compensator is designated by $m^* u_{DC}$. If the modulation signal m is sinusoidal, it would be distorted by the fluctuation. Therefore, the compensation of the fluctuation is preferably carried out in order to keep the output voltage free from the second harmonic. The division of the filtered DC voltage (without fluctuation) output by the filter 15 by the instantaneous DC voltage $u_{DC}$ (with fluctuation) provides the compensation signal to the subtractor 19. The output of the coordinate transformation is multiplied by this compensation signal. Therefore, the compensation signal input to the subtractor 19 can be expressed as $u_{DC0}/u_{DC}$ where $u_{DC0}$ is the DC component of the capacitor voltage $u_{DC}$. Therefore, the modulation signal can be written as $$m = u_{DC0} m_0 / u_{DC} \qquad (3.1)$$

where $m_0$ is the output of transformation unit 13 and the output voltage of $u_c$ of the compensator is proportional to $m_0$ as $$u_c = u_{DC0} * m_0 \qquad (3.2)$$

Whilst FIG. 8 shows the principle configuration of a controller for a single phase system, the three-phase system controller of FIG. 9 is completely analogous to the single-phase system in FIG. 8. In addition to the units in FIG. 8, FIG. 9 also includes the three-phase polar transformation unit 21 and the phase rotation unit 17. The phase detector 18 receives a signal from the voltage detector 23 which detects the phases of the three line voltages with respect to a reference frame ω. Essentially, the three-phase polar transformation unit 21 outputs the current amplitude $i_d$ on a three-phase current value detected by the current detector 24. Likewise, the reference signals sin θ, cos θ output by the phase detector 18 in FIG. 8 are here output by the current phase detector 17. The coordinate transformation means 14 receives, as in FIG. 8, the modulation indexes $m_q$, $m_d$ as well as the detected current amplitude $i_d$ output by the three-phase-polar transformation unit 21. The other units in FIG. 9 entirely correspond to the units already described with reference to FIG. 8 with the difference that the compensator 3, the DC voltage fluctuation compensation means 13, the coordinate transformation means 14, the DC voltage controller 16 and the 2f-filter are respectively provided for each phase.

As explained above, basically the reactive series compensator 3 outputs a reactive voltage $u_c$ and for this reason somehow the control system also in the three phase system needs an input about the phase of the AC line current i. In FIG. 9, in the three phase system, a indirect measurement of phase using the AC voltage is employed. The phase detector 18 containing a phase locked loop PLL first produces the phase of the AC voltage. However, the phase of the AC voltage is not identical to the phase of the AC current such that a modification is required. This modification is made by the phase difference detection unit 21 and the phase rotation unit 17. Using these units 21, 17, the modified signals sin θ_cos θ are synchronized to the AC current i. The function of these units is as follows.

The unit 21 receives a three phase AC current as detected by the current sensor 24 and outputs its amplitude and phase difference to the phase of the AC voltage (as supplied by the outputs sin ωt, cos ωt from the phase detector 18 which senses the phase of the AC line voltage). Therefore, the unit 21 outputs the current amplitude $i_d$ on the basis of an amplitude detection and the phase Φ via the phase difference detection.

The unit 18, as explained, is basically responsible for the phase detection. It outputs the sine and cosine functions of the corresponding phase. Therefore, cosine and sine functions represent a unity amplitude signal of the input AC voltage. For example, one phase of AC voltage and the cosine function have the same phase and the other phase has ±120° difference. The unit amplitude AC signals are employed in unit 14. The phase rotation unit 17 receives the cosine and sine functions of the voltage PLL unit 18 which each have the same phase as the AC line voltage. However, the coordinate transformation means 14 needs the AC current phase and not the AC voltage phase. Therefore, the phase rotation means 17 modifies the output by the voltage PLL unit 18 such that the cosine and sine functions has the same phase as the AC current. This is basically achieved by a rotational transformation of the vector which is represented in Cartesian coordinates by the Cartesian components, namely cosine and sine.

However, as can clearly be seen from the above coupled equations (1.1)–(1.5) and (2.1)–(2.16), the control in the controller in FIGS. 8, 9 performs a current and a voltage control which is not independent.

SUMMARY OF THE INVENTION

The above described control systems for the current and voltage control are summarized in a block diagram in FIG. 10. That is, a current control loop is provided by the units 24, 21, 18, 22, 20 and a voltage control loop is provided by the units 26, 15, 19, 16. A combiner 14, 13 can be identified which combines the modulation index $m_q$ and $m_d$ in order to eventually output the modulation signal m to the compensator 3.

As can already be detected from equation (2.12), (2.13) and (2.16), the intrinsic problem of the controller is that— due to the coupling of the current and the voltage due to the line reactance $L_{AC}$—the control is intrinsically performed in a manner such that the voltage $u_{DC}$ is also dependent on the modulation index $m_q$ (as indicated with the schematic line VDEP) and that the detected current $i_d$ is intrinsically also dependent on the modulation in $m_d$ (as schematically indicated with the schematic line CDEP).

The schematic drawing in FIG. 11 shows the same dependency as indicated with the schematic lines in VDEP, CDEP in FIG. 10. FIG. 12b shows examples of the frequency characteristics of the transfer functions of FIG. 11 and different current amplitudes of the power transmission lines. As shown in FIG. 12, the coupling from the active component of the modulation index $m_d$ to the current amplitude $i_d$ is larger than the main transfer function of the current amplitude. The other coupling has a larger gain at high frequency region compared to the main transfer function. Furthermore, the main transfer functions are varied by the operation point (in this case current amplitude), thus the control performance will be degraded using a control system as in FIG. 11. Furthermore, it should be noted that the coupling control of FIGS. 10, 11 takes place independently as to whether a single-phase system or a three-phase system is considered.

FIG. 12a shows the step responses of the basic control including the coupling control. As is shown at the time point 0.1 in FIG. 12a, when the DC voltage is changed in a step function (in order to determine the dynamic coupling of the voltage to the current) there is a large pulse in the AC line current. Likewise, when a step function—similar change of the DC line current $e_d$ is performed, then—at time point 0.5—a variation of the DC voltage also occurs. Therefore, also FIG. 12a illustrates that the voltage and current control cannot be performed independently in the conventional controllers for the transformerless reactive series compensator.

OBJECT OF THE PRESENT INVENTION

As explained above, in the conventional controllers the current control will depend on the voltage control and the voltage control will depend on the current control (even though the cross-coupling of the voltage to the current will be more intensive than the coupling of the current to the voltage).

Therefore, the object of the present invention is to provide a controller in which the current and voltage control are independent from each other, i.e. that the current can be controlled by the current control command independent from the voltage and that the voltage can be controlled in response to the voltage control command independent of the current.

SOLUTION OF THE OBJECT

This object is solved by a controller for controlling a reactive series compensator inserted into a power transmission line, comprising a line current detection means for detecting the line current flowing in the power transmission line; a DC voltage detection means for detecting a DC voltage of a capacitor connected to a modulator of the inverter of the reactive series compensator; a modulation signal generation means for generating an inverter modulation signal in the form of $m=m_d \cos(\omega t)-m_q \sin(\omega t)$, ω=line frequency to be supplied as a modulation signal to the modulator of the compensator; a current control loop for controlling the line current to a reference value, a current_ controller of said current control loop outputting a modulation index $m_q$ for the modulation signal; a voltage control loop for controlling the DC voltage of the DC capacitor to a predetermined reference voltage, a DC voltage controller of said voltage control loop outputting a modulation index $m_d'$ for said modulation signal, decoupling control means receiving the modulation index $m_q'$ from the current controller and the modulation index $m_d'$ of the DC voltage controller and outputting new modulation indices $m_q$ and $m_d$ to the modulation signal generation means such that the line current is independent from the output $m_d'$ of the DC voltage controller and the DC capacitor voltage is independent from the output $m_q'$ of the current controller, wherein the AC current amplitude and the DC capacitor voltage can be controlled independently.

According to one aspect of the invention a decoupling control means is provided within the voltage and current control loops and is adapted to make the current control independent of the modulation index of the voltage control and to make the voltage control independent of the current modulation index.

Preferably, the decoupling control means is provided upstream of the coordinate transformation means of a conventional controller.

Decoupling control means of the present invention is based either on the linear control based on transfer functions of linear systems or on the direct compensation based on non-linear differential equations which are approximated.

Further advantageous embodiments and improvements of the invention are listed in the attached dependent claims.

Hereinafter, the invention will be described with reference to its advantageous embodiments. However, it should be understood that what is described below in the figure description only relates to what the inventors presently conceive as best mode of the invention. In particular, the invention may comprise embodiments which consist of features which have been independently described and claimed in the claims and the description.

BRIEF DESCRIPTION OF THE DRAWINGS

In the drawings, the same or similar reference numerals denote the same or similar parts throughout. In the drawings:

FIGS. 5(a)–(c) show phasor diagrams for controlling the line current;

FIG. 11 shows a summary diagram of the coupling effects shown in FIG. 10;

FIG. 12a shows step responses of the basic controller shown in FIGS. 8, 9;

FIG. 13a shows the principle of the invention including a decoupling control means upstream of the coupling unit illustrated in FIG. 11;

FIG. 13b shows a principle block diagram of a controller according to the invention including the decoupling control means according to FIG. 13a.

FIG. 17a shows the step responses using a decoupling control according to the invention;

FIG. 17b shows the gain characteristics with a simplified decoupling control according to one embodiment of the invention;

In order to illustrate the principle of the invention, hereinafter the mathematical description of how the coupled current and voltage control equations can be decoupled is presented.

PRINCIPLE OF THE INVENTION

As already explained with reference to FIGS. 10, 11, two main control loops for the current and the voltage have a cross-coupling in the prior art, such that the decoupling control is required for an accurate control. The present invention provides such a decoupling control and the principle thereof is based on a direct compensation which is based on non-linear differential equations.

Figure 10:
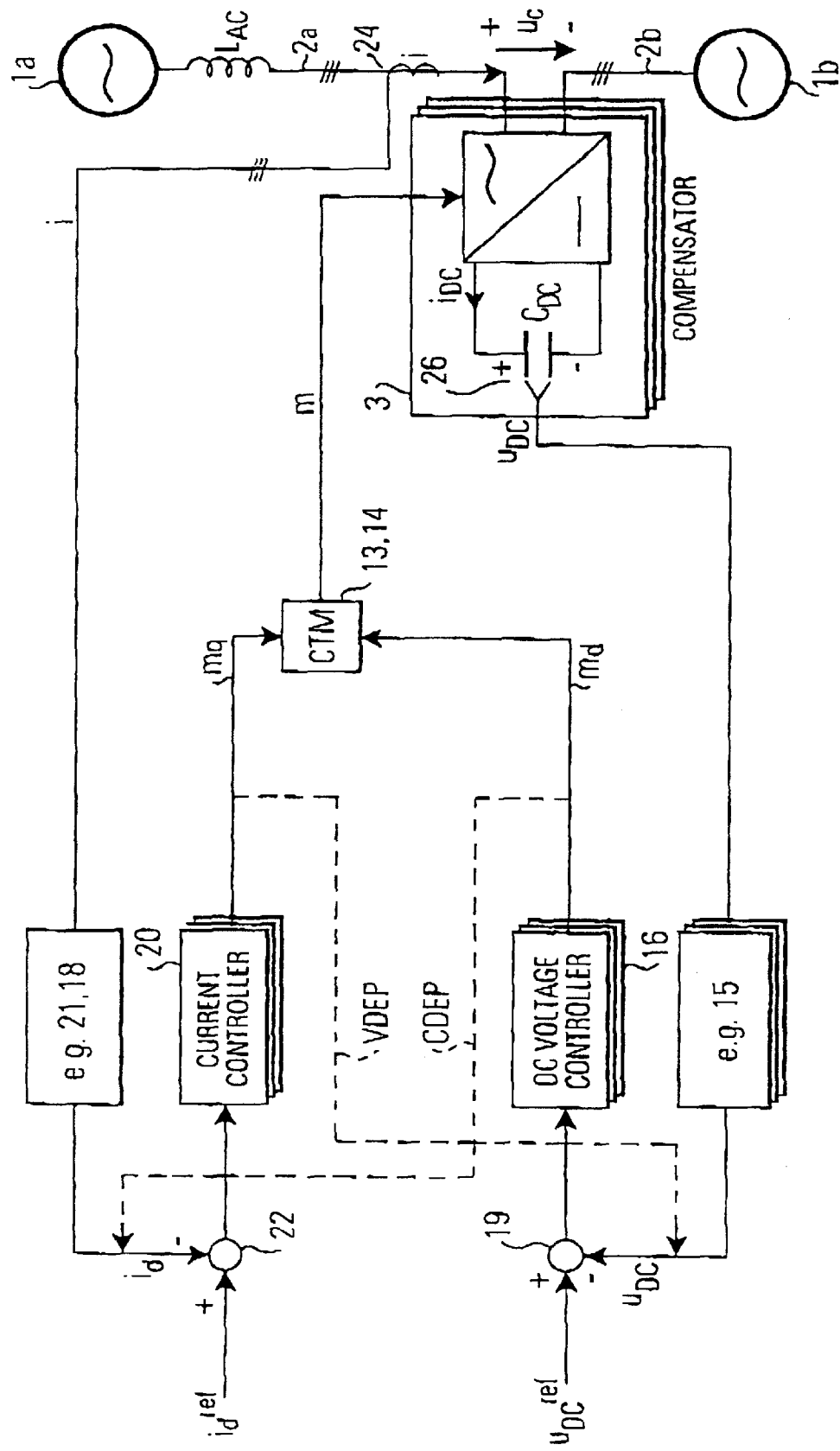
FIG. 10 an overview diagram of the coupling effects in the controllers of FIG. 8, FIG. 9.

Before coming to a detailed derivation of how the coupled differential equations can be decoupled, some general considerations are made with respect to FIGS. 13a, 13b when compared with FIG. 10 and FIG. 11.

Figure 6:
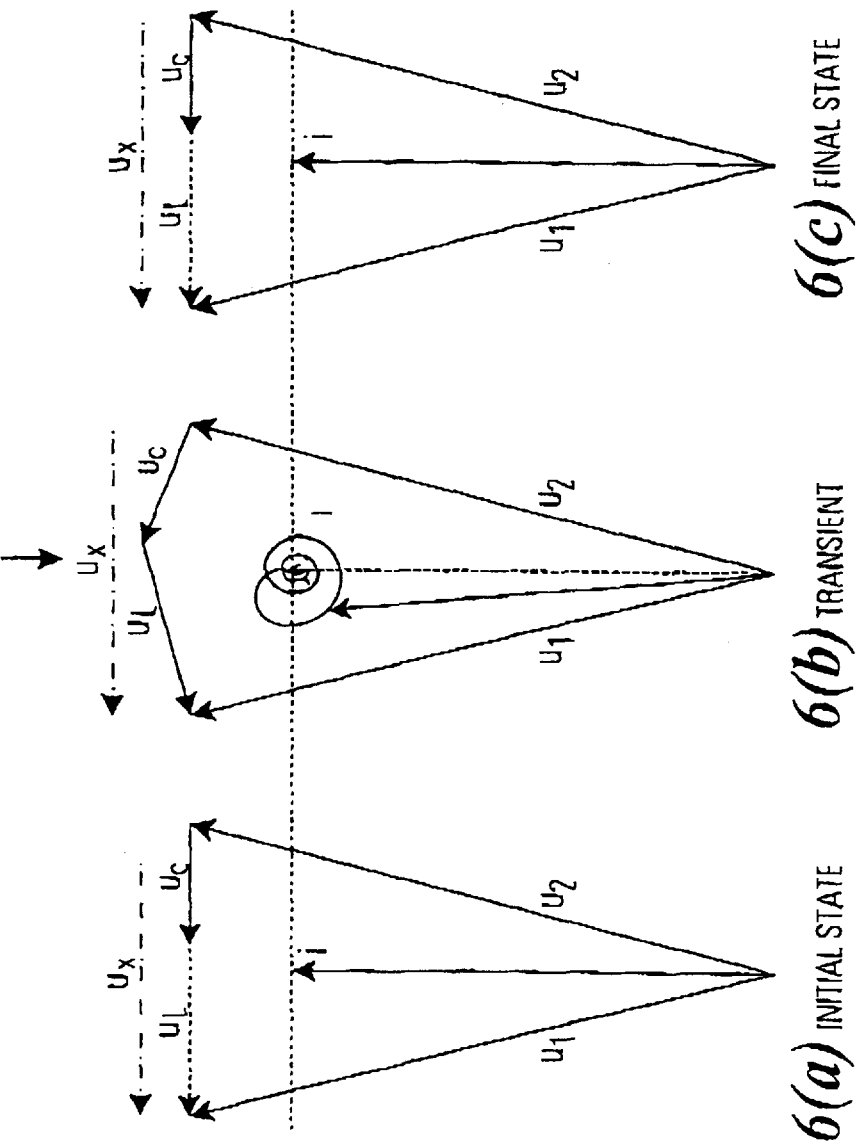
FIGS. 6(a), (b), (c) show phasor diagrams of the voltage and current dependency when charging the DC capacitor $C_{DC}$.
Figure 7:
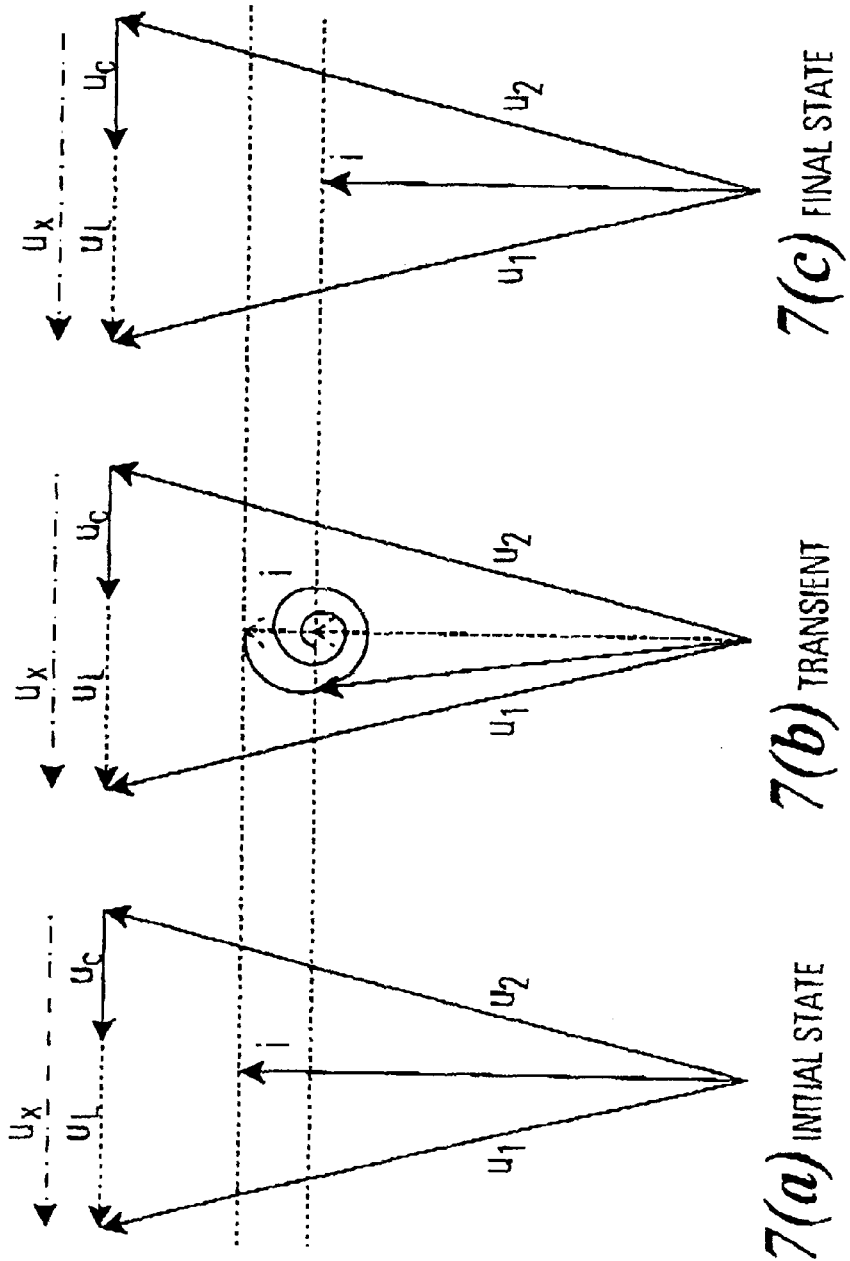
FIGS. 7(a), (b), (c) show the charging of a DC capacitor in a transient state.

FIG. 13b shows the principle block diagram of a controller according to the invention. As shown in FIG. 13b, the inventive controller comprises a current detector 24 and a current control loop formed by the feedback path 21, 18 and the forward path including the current controller 20. Similarly, a voltage control loop comprises the voltage detector 26, the feedback path 15 and a forward path comprising the DC voltage controller 16. By setting desired values for the reference current value $i_d^{ref}$ and the reference voltage $u_{DC}^{ref}$ the line current i and the voltage $u_c$ can be adjusted via the modulation signal m, as was explained above with reference to FIGS. 5, 6, 7.

However, as shown in FIG. 13b, the inventive controller comprises a decoupling control means 25 downstream of the current controller 20 and the DC voltage controller 16. The decoupling control means 25 outputs a first modulation control signal $m_q$ for controlling the line AC current i and a second modulation control signal $m_d$ for controlling the compensator output voltage.

The first and second control signals $m_q$, $m_d$ are selected such that a change in the first control signal $m_q$ will not influence the DC control voltage $u_{DC}$, i.e. such that the capacitor voltage $u_{DC}$ is independent of the control signal $m_u$ output by the current controller 20. Similarly, the second control signal $m_d$ is selected such that it does not influence the line current, i.e. the line current i is independent from the second-control signal $m_d$. Therefore, although only one modulation signal m is applied to the compensator (a complex signal having a predetermined amplitude and phase), a change of $i_d^{ref}$ will only alter the amplitude of the line current and a change in $u_{DC}^{ref}$ will only alter the DC capacitor voltage $u_{DC}$ and hence only the output voltage $u_c$ of the compensator. Therefore, current and voltage can be adjusted independently in the inventive controller due to the use of the decoupling control means 25. That is, in the inventive controller the current control loop operates independently of the voltage control loop.

Essentially, as seen by a comparison between FIG. 11 and FIG. 13a, the decoupling control means 25 must perform some kind of inverse operation such that the coupling effects due to the current transfer function block CTF, the voltage transfer function block VTF, the voltage current transfer block VCTF and the current voltage transfer function block CVTF are canceled. That is, if the current controller 20 and the voltage controller 16 operate as in the conventional system in FIG. 10, then the decoupling control means 25 will output some kind of predestorted modulation indices $m_q'$, $m_d'$ which—when transferred through the blocks CTF, VCTF, CVTF, VTF will precisely cancel the effects of these blocks. In particular, the decoupling control means 25 allows to get rid of the cross-coupling blocks VCTF, CVTF which cause the coupling of the current control loop and the voltage control loop.

Hereinafter, one example is given how a decoupling control means 25 can be preferably built on the basis of approximated non-linear differential equations. However, it should be noted that it is also possible to derive such a decoupling control means 25 on the basis of transfer functions of a linearized system. The direct compensation based on non-linear-differential equations has the advantage that the operating point can be compensated directly and that it is only dependent on a few system parameters. It also has the advantage that only currents and voltages need to be measured and fed to the controller. Thus, the non-linear differential equation approach is the preferable approach with a wide range operation and possibilities of which most of the state variables can be measured.

To derive the relevant differential equations for the decoupling control the AC current equation has to be derived. This can be done by taking the derivative of equation (2.12) with respect to time which leads to the following equation:

$$L_{AC}\frac{d^2 i_d}{dt^2} = \qquad (4.1)$$
$$-R_{AC}\frac{d i_d}{dt} + \frac{d\omega}{dt}L_{AC}i_q + \omega L_{AC}\frac{d i_q}{dt} + \frac{d u_{xd}}{dt} - \frac{d m_d}{dt}u_{DC} - m_d\frac{d u_{DC}}{dt}$$

Using equations (2.13) and (2.16) the full differential equation for the line current—split in the $i_d$ and $i_q$ components—can be derived as follows:

$$L_{AC}\frac{d^2 i_d}{dt^2} + R_{AC}\frac{d i_d}{dt} + \omega^2 L_{AC}i_d = \qquad (4.2)$$
$$-\left(\omega u_{DC} + \frac{m_d i_q}{2C_{DC}}\right)m_q - \frac{m_d^2}{2C_{DC}}i_d + \left(\frac{d\omega}{dt}L_{AC} - \omega R_{AC}\right)i_q -$$
$$\frac{d m_d}{dt}u_{DC} + \left(\frac{G_{DC}u_{DC}}{C_{DC}} - \frac{\Delta i_{DC}}{C_{DC}}\right)m_d + \omega u_{xq} + \frac{d u_{xd}}{dt}$$

In equation (4.2) the expression in brackets before $m_q$ is the input to control the AC current $i_d$ and the expressions multiplied with $m_d$ or the derivative of $m_d$ are the coupling terms. The terms multiplied with the AC voltage components can be considered as disturbances. Comparing equation (4.2) with FIG. 11, it can be seen that the time derivative $dm_d/dt$ is the main transient coupling block VCTF and $\omega u_{DC}$ in the expression multiplied with $m_q$ is the influence of changing operation point. For a simplification, the DC current fluctuation $\Delta i_{DC}$ can be ignored, because usually the frequency of the fluctuation is much higher than the bandwidth of the controller. In addition, disturbances can be controlled by feedback or feedforward loops and frequency varying is regarded only a small influence by comparison to the coupling. Therefore, equations (4.2) and (2.16) can be approximated as follows:

$$L_{AC}\frac{d^2 i_d}{dt^2} + R_{AC}\frac{d i_d}{dt} + \omega^2 L_{AC}i_d = -\left(\omega u_{DC} + \frac{m_d i_q}{2C_{DC}}\right)m_q - \qquad (4.3)$$
$$\frac{m_d^2}{2C_{DC}}i_d - \omega R_{AC}i_q - \frac{d m_d}{dt}u_{DC} + \frac{G_{DC}u_{DC}}{C_{DC}}m_d$$

$$C_{DC}\frac{d u_{DC}}{dt} + G_{DC}u_{DC} = \frac{1}{2}(m_d i_d + m_q i_q) \qquad (4.4)$$

These two equations (4.3), (4.4) completely describe the dynamic behaviour of the coupling of the two control loops. According to the invention, modulation indices $m_q$, $m_d$ should be selected such that the current control loop becomes independent from the voltage control loop, i.e. that the AC current amplitude and the DC voltage can be controlled independently. This requirement can be expressed mathematically as follows:

$$L_{AC}\frac{d^2 i_d}{dt^2} + R_{AC}\frac{d i_d}{dt} + \omega^2 L_{AC}i_d = -K_q m_q' \qquad (4.5)$$

$$C_{DC}\frac{d u_{DC}}{dt} + G_{DC}u_{DC} = \frac{1}{2}K_d m_d' \qquad (4.6)$$

In these two equations (4.5), (4.6) it can simply be requested that $K_d$ and $K_q$ are constants, $m_d'$ and $m_q'$ are the new control signal inputs (or modulation indices) for the current amplitude control and the DC voltage control. Indeed, a perfect decoupling would be achieved if the system can be designed according to equations (4.5) and (4.6) as long as the compensator operates inside its limits. Comparing equations (4.3)—equations (4.5) and equations (4.4)—(4.6), $m_d$ and $m_q$ should satisfy the following equations:

$$K_q m_q' = \qquad (4.7)$$
$$\left(\omega u_{DC} + \frac{m_d i_q}{2C_{DC}}\right)m_q + \frac{m_d^2}{2C_{DC}}i_d + \omega R_{AC}i_q + \frac{d m_d}{dt}u_{DC} - \frac{G_{DC}u_{DC}}{C_{DC}}$$

$$K_d m_d' = m_d i_d + m_q i_q \qquad (4.8)$$

These equations can be solved for $m_d$ and $m_q$ as a function of $m_d'$, $m_q'$ as follows:

$$m_d = \frac{\omega R_{AC}i_q^2 + \omega u_{DC} K_d m_d' + \left(u_{DC}\frac{d m_d}{dt} - K_q m_q'\right)i_q}{\omega i_d u_{DC} + \frac{1}{C_{DC}}\left(G_{DC}u_{DC} - \frac{K_d m_d'}{2}\right)i_q} \qquad (4.9)$$

-continued $$m_q = \frac{\frac{1}{C_{DC}}\left(G_{DC}u_{DC} - \frac{K_d m'_d}{2}\right)K_d m'_d - \left(\omega R_{AC}i_q + u_{DC}\frac{dm_d}{dt} - K_q m'_q\right)i_d}{\omega i_d u_{DC} + \frac{1}{C_{DC}}\left(G_{DC}u_{DC} - \frac{K_d m'_d}{2}\right)i_q} \quad (4.10)$$

Of course it is not possible to technically realize equation (4.9) in the controller directly, because there is an additional time dependent derivative of $m_d$. Even though equation (4.9) can be considered as a non-linear differential equation of $m_d$ it is not possible to realize this equation in an on-line controller because the coefficient of the derivative is $i_q$ which takes positive or negative values around zero. In any case, the time derivative of $m_d$ in equation (4.9) can be ignored such that the modulation $m_d$ can be calculated as follows:

$$m_d = \frac{\omega R_{AC}i_q^2 + \omega u_{DC}K_d m'_d - i_q K_q m'_q}{\omega i_d u_{DC} + \frac{1}{C_{DC}}\left(G_{DC}u_{DC} - \frac{K_d m'_d}{2}\right)i_q} \quad (4.11)$$

However, with equation (4.11) and (4.10) a perfect decoupling control can not be realized since these equations still depend on the circuit parameters such as resistance, inductance and capacitance. In equation (4.10) the main coupling is still the time derivative of $m_d$. Moreover, the q-axis component $i_q$ of the current is kept zero by the reference frame detection (essentially the unit 17 makes $i_q$=0). $m_d'$ is usually small and the resistance and the conductance are also negligible. Therefore, $R_{AC}$=0 and $G_{DC}$=0 can be assumed in equations (4.10) and (4.11), leading to the following two equations (4.12), (4.13):

$$m_d = \frac{\omega u_{DC}K_d m'_d - i_q K_q m'_q}{\omega i_d u_{DC} - \frac{K_d m'_d}{2C_{DC}}i_q} \quad (4.12)$$

$$m_q = \frac{-\frac{(K_d m'_d)^2}{2C_{DC}} - \left(u_{DC}\frac{dm_d}{dt} - K_q m'_q\right)i_d}{\omega i_d u_{DC} - \frac{K_d m'_d}{2C_{DC}}i_q} \quad (4.13)$$

Now the decoupling control using equations (4.12), (4.13) with the simplification only depends on one system parameter $C_{DC}$ and this is much easier to realize then the more complicated equation. A further simplification can be made in equations (4.12), (4.13), namely neglecting $m_d'$, $i_q$ (because $m_d'$ is small and $i_q$ can be kept zero by the reference frame detection) and $m'_d{}^2$ (since $m_d$ is small), equations (4.12) and (4.13) yield the following final equations for the decoupling controls:

$$m_d = \frac{1}{i_d}\left(K_d m'_d - \frac{i_q K_q m'_q}{\omega u_{DC}}\right) \quad (4.14)$$

$$m_q = \frac{K_q m'_q}{\omega u_{DC}} - \frac{1}{\omega}\frac{dm_d}{dt} \quad (4.15)$$

Since the reference frame detection is performed, $i_q$=0 in equation (4.14) (due to the unit 17) and the constant and real value $K_d$ and $K_q$ can be assumed to be part of the $m_d'$, $m_q'$ values (they only represent a further constant in the current and voltage control loops). Therefore, the following final set of decoupled equations can be used for the decoupling control means 25, namely:

$$m_d = \frac{1}{i_d}(K_d m'_d) \quad (4.16)$$

$$m_q = \frac{K_q m'_q}{\omega u_{DC}} - \frac{1}{\omega}\frac{dm_d}{dt} \quad (4.17)$$

Figure 13C:
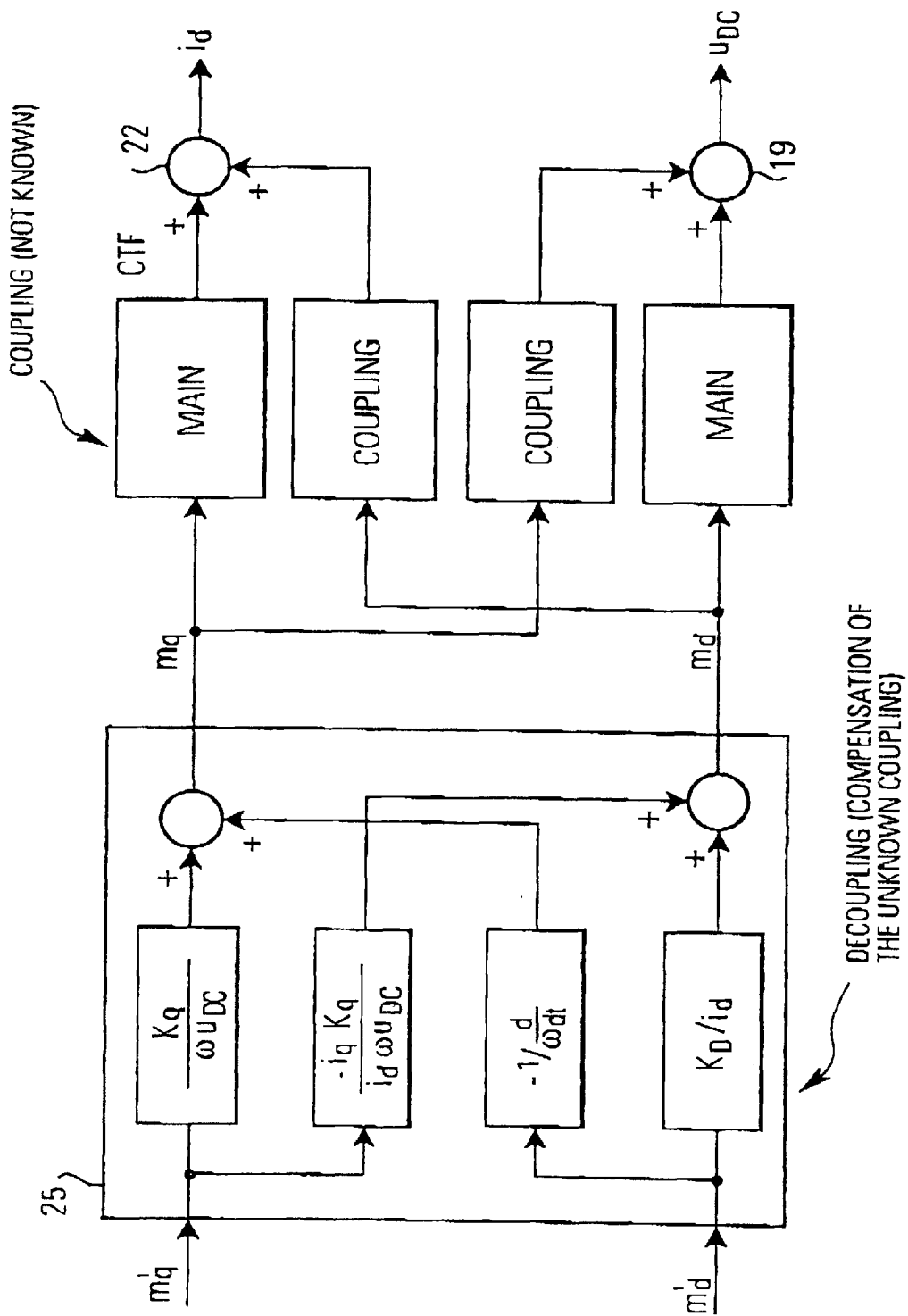
FIG. 13c shows the decoupling performed according to an approximation of the non-linear differential equation.

Selecting $m_d$ and $m_q$ in accordance with the equation (4.16), (4.17) the current control and voltage control can be carried out independently as required by equation (4.5), (4.6). As shown in FIG. 13c, the coupling downstream of the means 25 is compensated by the decoupling according to equations (4.14), (4.15).

Hereinafter, a special embodiment of the decoupling means 25 as shown in FIG. 13c using a linearization and the three-phase system already discussed with reference to FIG. 9.

FIRST EMBODIMENT

3-Phase System with Voltage PLL

Figure 9:
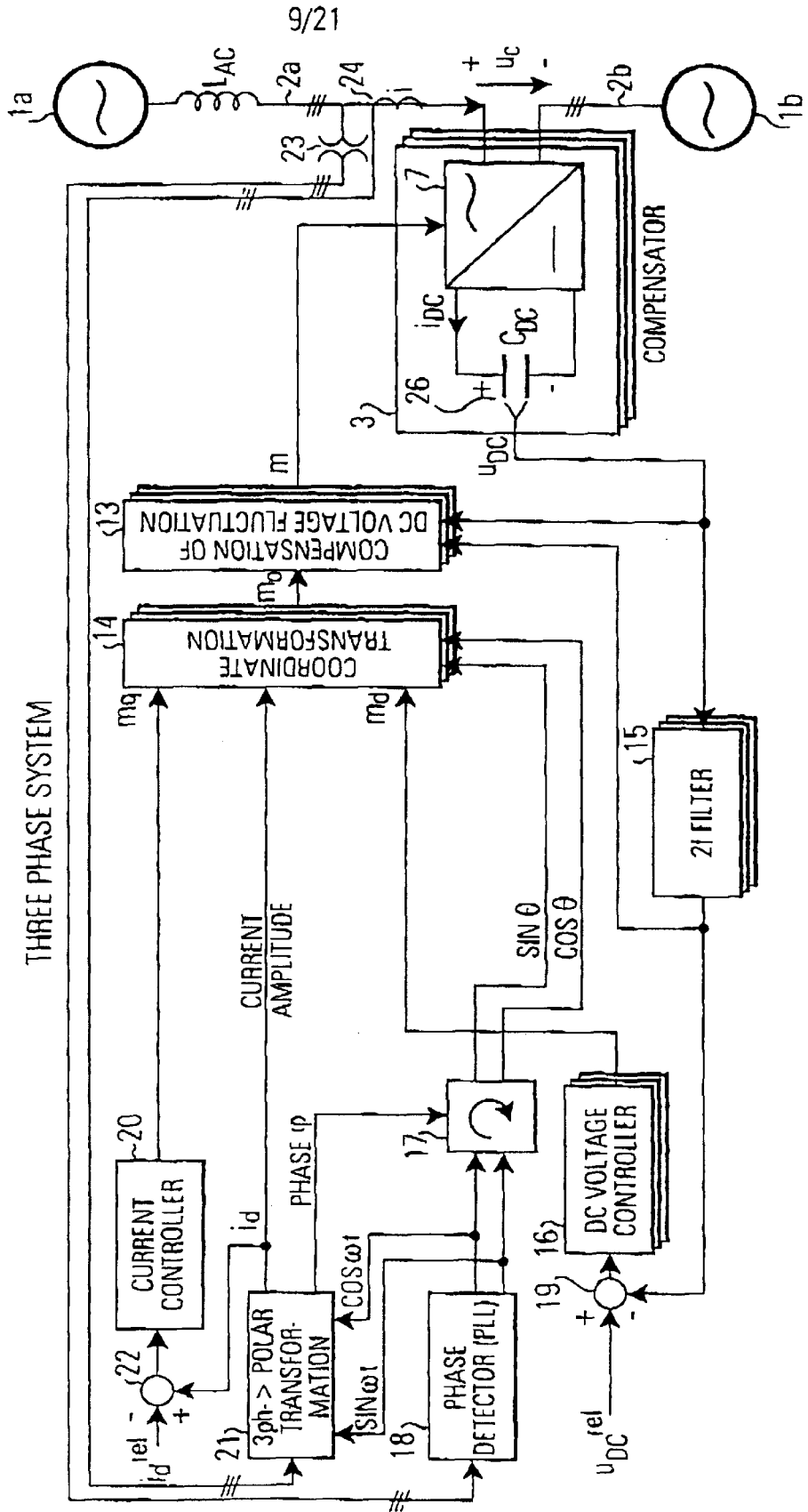
FIG. 9 shows a conventional three-phase controller.
Figure 14:
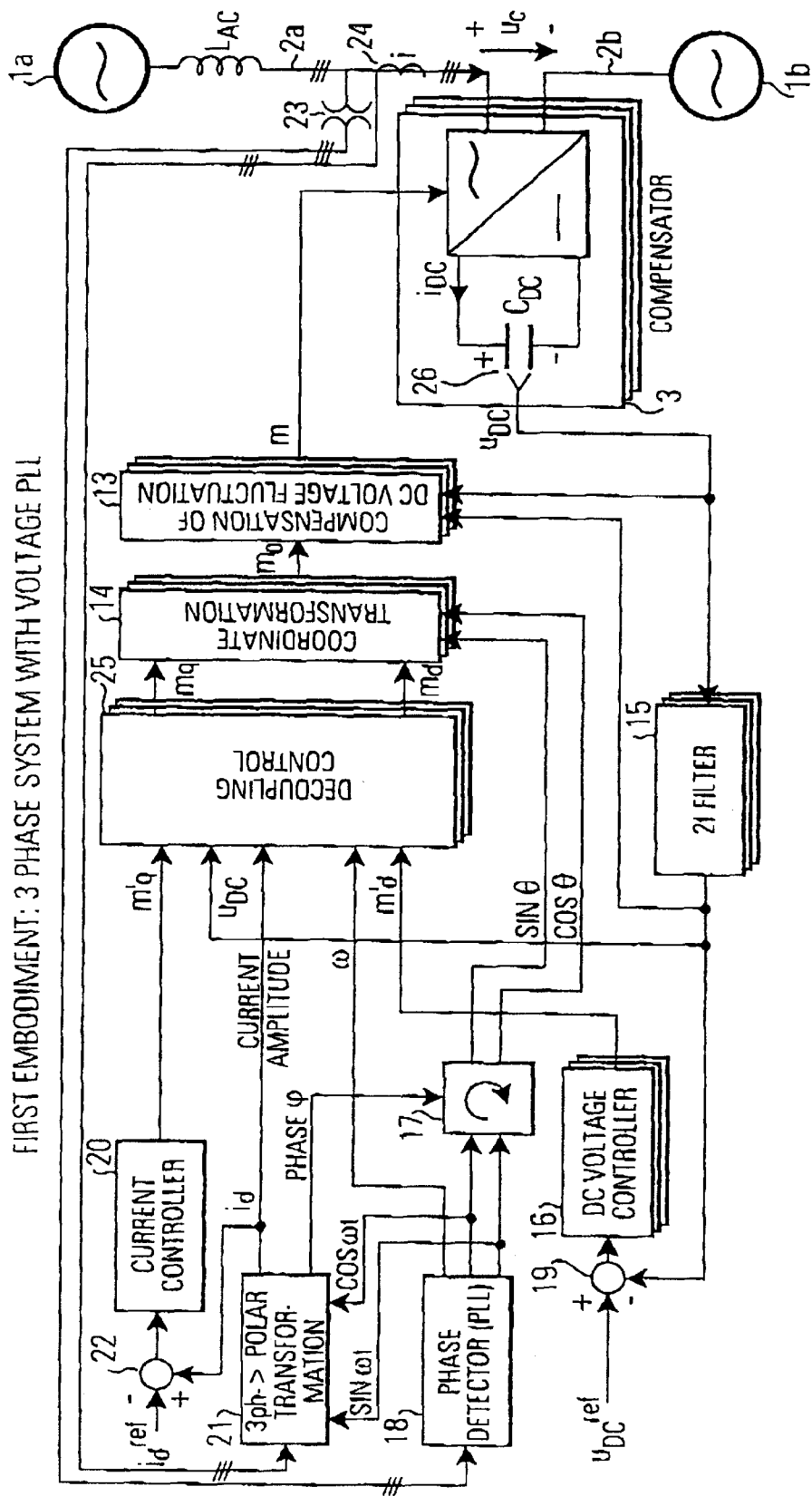
FIG. 14 shows a block diagram of the controller including a decoupling control according to the first embodiment of the invention of a three-phase system with a voltage PLL.

FIG. 14 shows the controller according to FIG. 9 (i.e. including an AC voltage detector 23, a voltage PLL phase detector 18 and the phase rotation means 17) but also including—according to the first embodiment of the invention—a decoupling control means 25. As can be detected from the equations (4.14)–(4.17), the decoupling control means 25 receives the output (modulation index) $m_q'$ of the current controller 20, the DC capacitor voltage $u_{DC}$, the current amplitude $i_d$, the line frequency ω and the output $m_d'$ of the DC voltage controller 16. For a three-phase system the decoupling control means 25, the compensator 3, the 2f-filter 15 and the DC voltage controller 16 is provided three times. The other units in FIG. 14, i.e. the current detector 24, the current amplitude and phase detection units 21, 18, the capacitor voltage detector 26, the mean voltage detector 15, the reference phase generation unit 17 (keeping $i_q$ in the control system 0), the reference frame detection 18, the coordinate transformation 19, the DC ripple compensation unit 13 and the voltage phase detector 23 correspond to those units already described in FIG. 9.

It should be noted that the resulting AC current and output voltage of the compensator without the DC voltage fluctuation means 13 and the 2f filter 15 include some harmonics, however, the decoupling control is effective even without these units. These units can preferably used in certain applications to suppress the harmonics. For example, if the capacitance of the DC capacitor is large enough to suppress the fluctuation then no additional units are needed. Alternatively, if the 2f filter (e.g. an LC filter) is configured with the DC capacitor in parallel in the DC circuit of the compensator 3, the units 13, 15 are again not needed. The latter solution is paractically a realistic_solution for the transformerless series compensator.

It can be seen from FIG. 14 that there is no input of $i_q$ to the decoupling control means 25 despite the equations (4.14), (4.15) (as illustrated in FIG. 13c) comprise one term—$i_q K_q m_q'/\omega u_{DC}$. As explained above, in the inventive controller the q-axis component $i_q$ of the current is kept zero by the reference frame detection in the three-phase-polar transformation means 21. Therefore, it is justified to rewrite the equations (4.14), (4.15) into equations (4.16), (4.17) for describing the embodiment of the decoupling means 25 in FIG. 14.

All factors in equations (4.16), (4.17) with the exception of the time derivative can be realized by hardware multipliers and dividers. However, the time derivative can have a very high gain in high frequency conditions and thus $dm_d/dt$ in equation (4.17) is difficult to realize with hardware such as operation amplifiers or microprocessors. However, as will be seen below with the special embodiment of the decoupling control means 25 in FIG. 15, the time derivative can be handled by means of a filter with a small time constant. The precise construction of an embodiment of the decoupling control means 25 is shown in FIG. 15.

Figure 15:
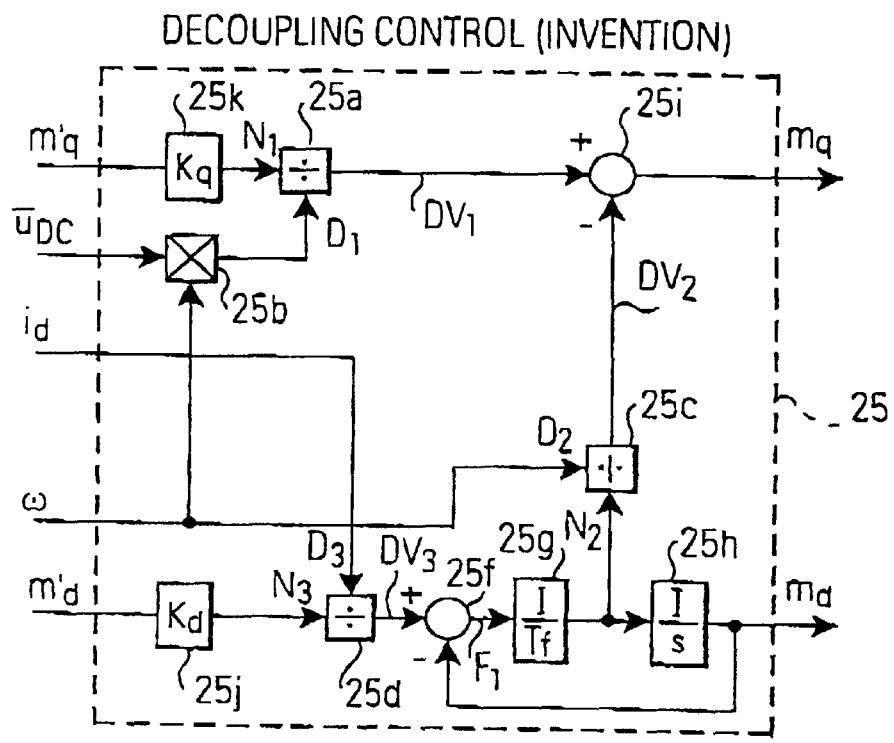
FIG. 15 is shows a detailed block diagram of the decoupling control means according to the invention.

In FIG. 15 the output $m_d'$ is multiplied with the constant $K_d$ in the multiplier 25j. Of course, it should be understood that the equations (4.16), (4.17) can be rescaled such that $K_d$ is 1 such that the additional multiplier 25j is not necessarily needed, i.e. $K_d$ can be unity. Likewise, the output $m_q'$ of the current controller is multiplied with the constant $K_q$ in the multiplier 25k ($K_q$ can also be unity due to a normalization). The multiplied signal N1 forms the nominator of the first divider 25a. The detected DC voltage $u_{DC}$ is multiplied by the reference frame frequency ω in the multiplier 25b. The multiplied signal $D_1$ is the denominator used for the division in the divider 25a. The output DV1 of the first inverter is supplied to an adder 25i. The line frequency ω is the denominator for the division in the second divider 25c and a signal $N_2$ output from the filter is the nominator of the second divider 25c. The multiplied signal DV2 is applied as inverted input to the adder 25i.

The multiplied output $N_3$ (=$m_d'K_d$) is applied as the nominator signal $N_3$ to a third divider. The denominator of the divider 25d is the d-axis current component $i_d$. The output DV3 of the third divider is applied to a second adder 25f which receives the output signal of the integration unit 25h in an inverted manner. The output of the second adder 25f is supplied to the $dm_D/dt$ feedback circuit 25f, 25g and 25h. The units 25g, 25h, 25f are needed in order to determine the second term in equation (4.7).

Since the main loop of the capacitance voltage control is designed to a limited band width in its frequency characteristics, placing a filter 25f with a small time constant in the main loop does not affect the characteristics of the main loop. The integrator 25h, the gain 25g and the subtractor 25f act together as filter and the input of the filter is the pure differentiation of $m_d$ with respect to time. Therefore, this coupling can perform a compensation properly by a pure differentiation using the filter function. The coupling of the other side which is compensated by division of the current, is also filtered. However, response of the current is also limited because of the inductance of the transmission lines and responses of the feedback control of the current amplitude.

The filter 25f, 25g, 25h having a small time constant $T_f$ in the main loop does not affect the characteristics of the main loop. The integrator 25h, the gain 25g and the subtractor 25f act together as the filter and the input $N_2$ of the integrator 25h is the pure differentiation of Md with respect to time. The input of the integrator 25h forms the nominator $M_2$ of the divider 25c. Thus, coupling can be compensated properly by the pure differentiation using the filter function. The coupling of the other side which is compensated by division of the current $i_d$ is also filtered and it could be degraded. However, the response of the current is also limited because of the inductance of the transmission lines and the response of the feedback control of the current amplitude.

FIG. 17b shows examples of the frequency characteristic of the transfer function of the control system shown in FIG. 14 using the decoupling control means 25 of FIG. 15. The main transfer functions are not affected by an operating point and coupling is reduced over 20 dB. Therefore, the decoupling control of the current amplitude $i_d$ and the capacitor voltage $u_{DC}$ can be achieved. In addition, configuration of the decoupling control in FIG. 15 is independent from the system parameters such as inductance $L_{AC}$ of the transmission lines 2a, 2b and the capacitance $C_{DC}$ Of the DC capacitor. This means that the controller of the compensator 3 requires only local variables which can easily be detected by the current detection or the voltage detection.

Figure 1A:
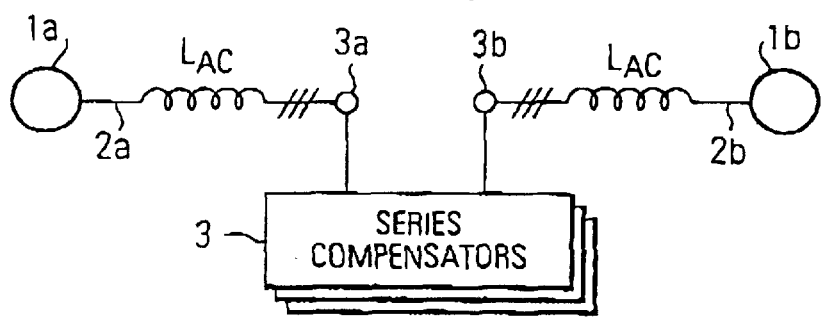
FIG. 1a shows a principle configuration of a series compensator in a power transmission system.
Figure 2:
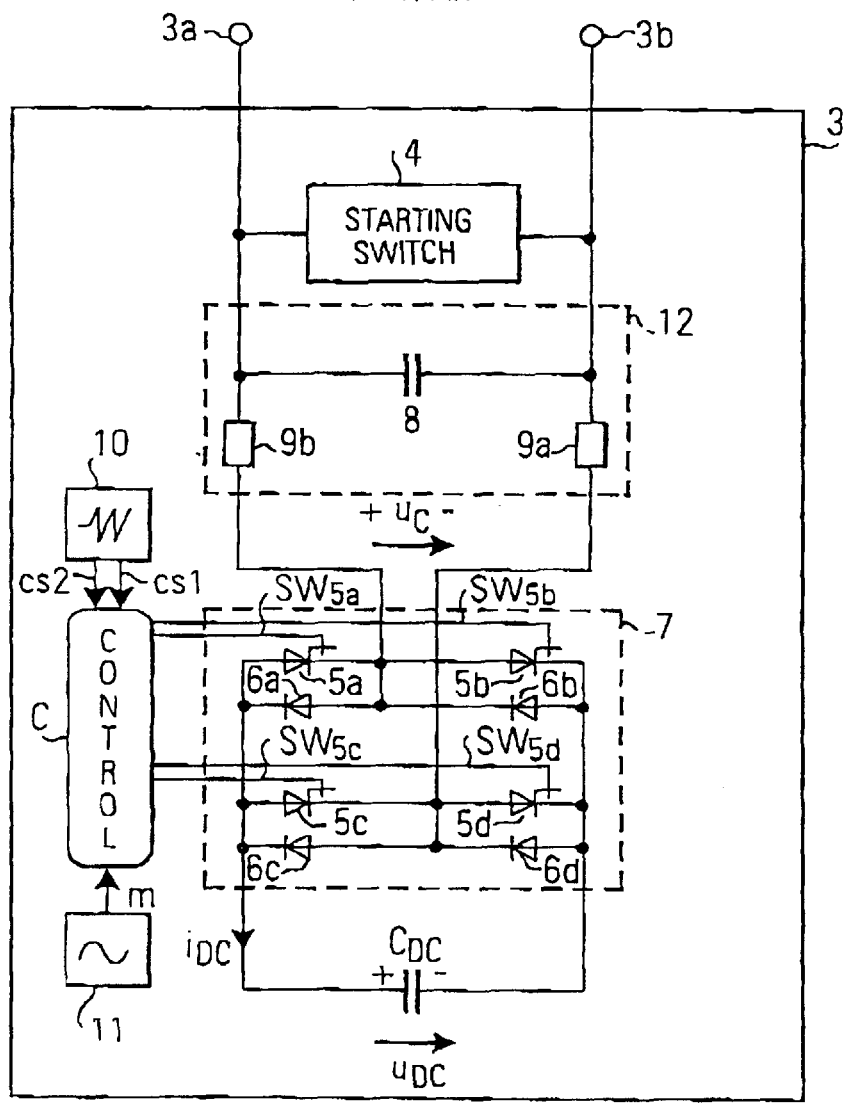
FIG. 2 shows a detailed block diagram of a typical compensator used in FIGS. 1a, 1b.
Figure 1B:
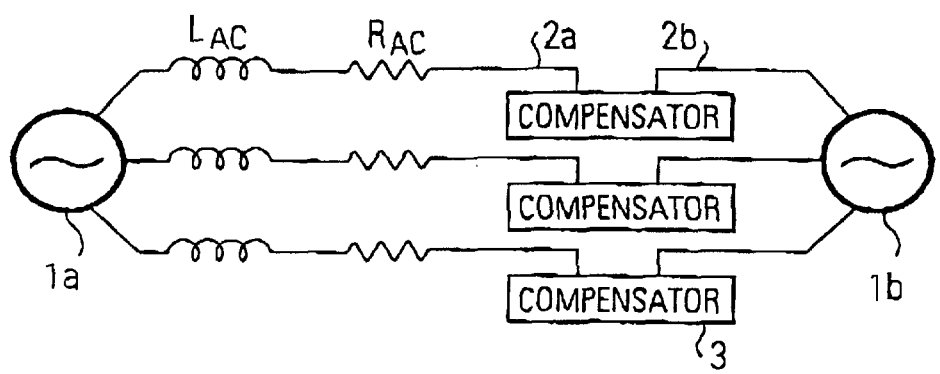
FIG. 1b shows a three-phase system incorporating compensators for each phase.
Figure 17C:
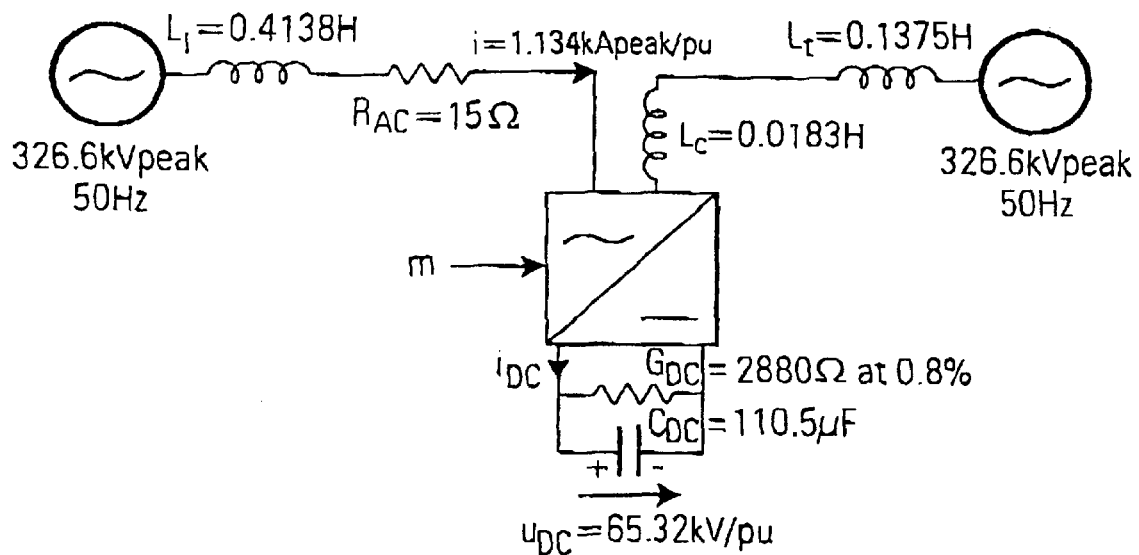
FIG. 17c shows a typical design example of the system according to the invention.
Figure 3:
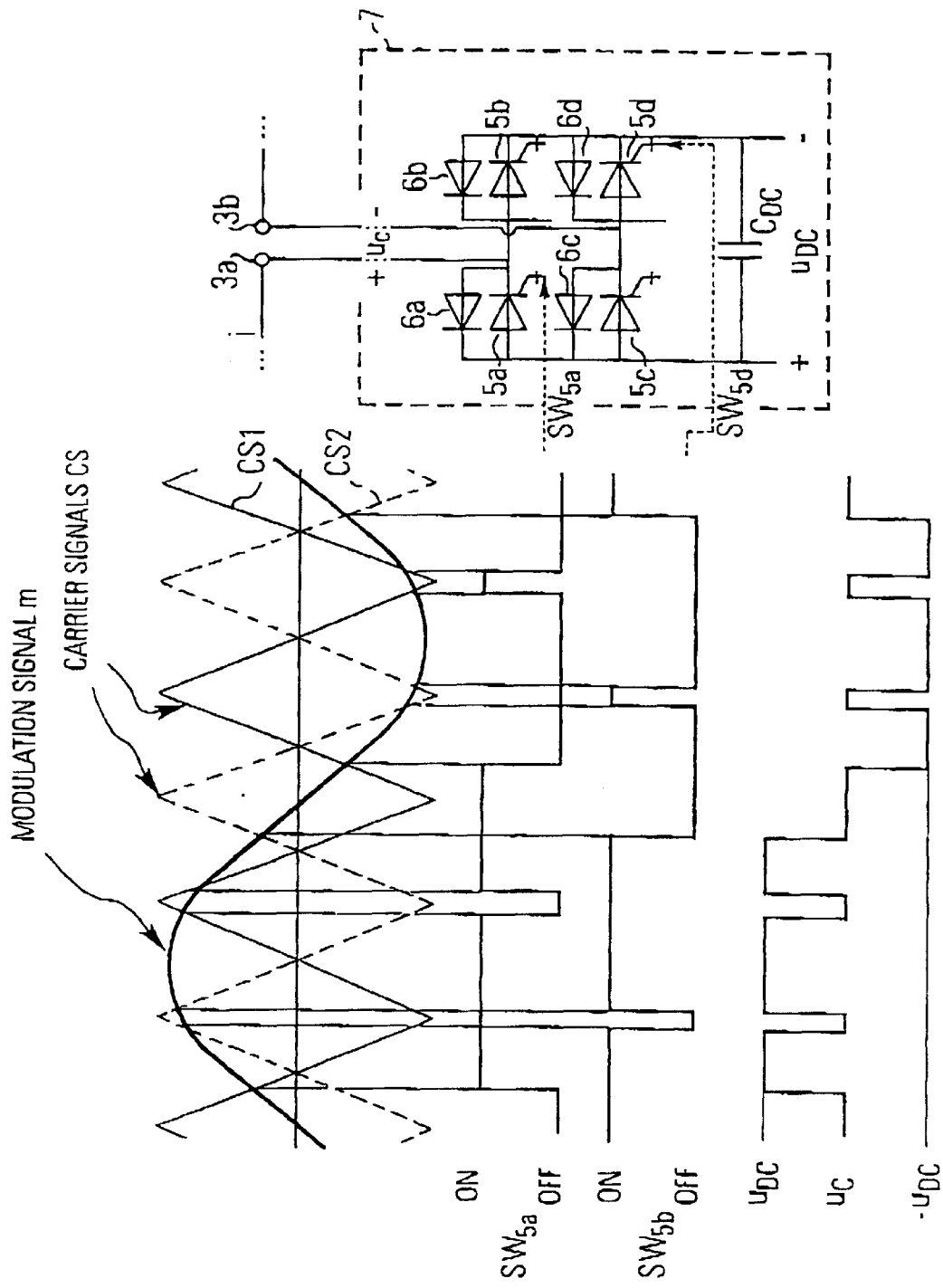
FIG. 3 shows a PWM control of the inverter shown in FIG. 2.
Figure 4A:
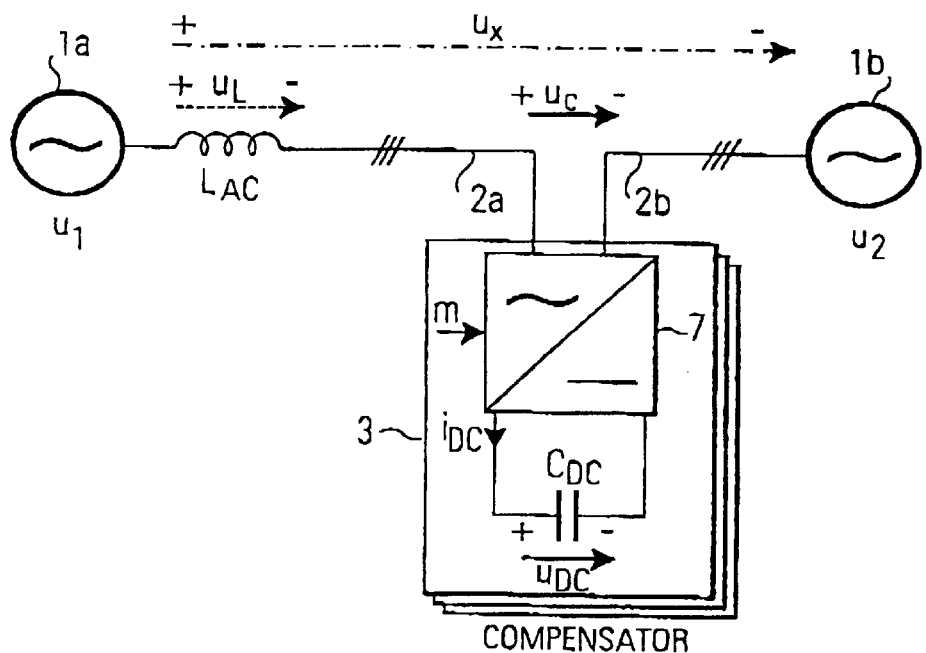
FIGS. 4a and 4b show a principle relationship of voltages and currents in the power transmission system including a compensator according to FIGS. 1a, 1b.
Figure 4B:
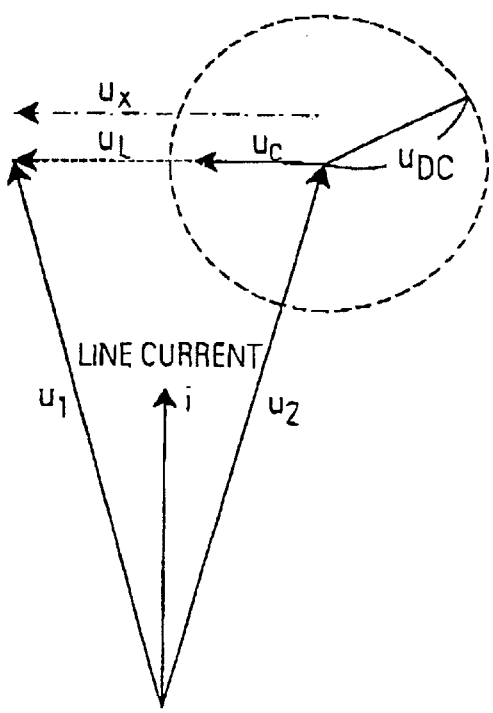
Figure 12B:
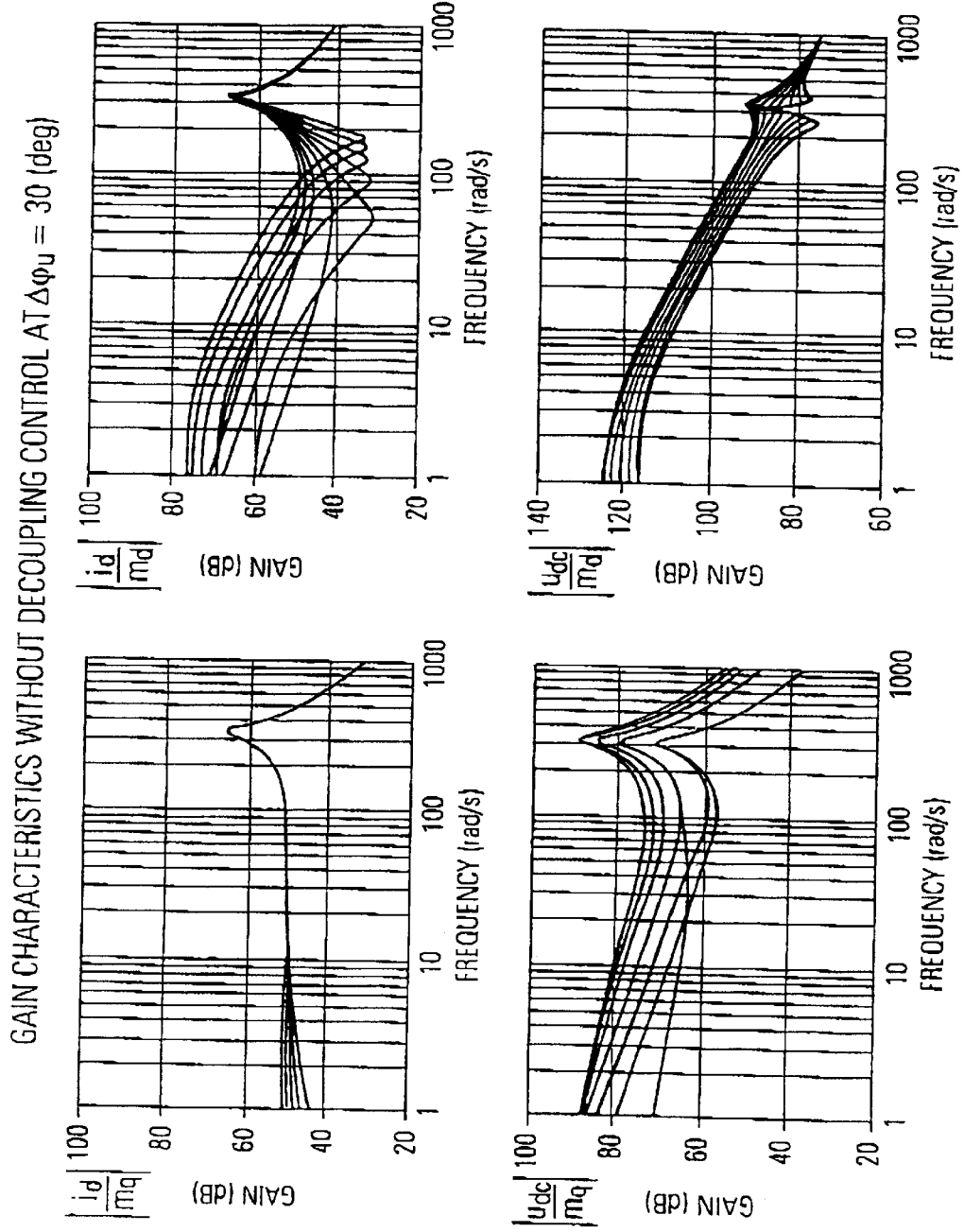
FIG. 12b shows gain characteristics of the conventional controllers in FIGS. 8, 9.

FIG. 17a shows by contrast to FIG. 12a of the prior art the step responses using a decoupling control. Whilst at time point 0.1 in FIG. 12a the current amplitude $i_d$ shows a ripple due to coupling, there is no change whatsoever if a voltage step occurs in FIG. 17a at time point 0.1. Likewise, if the current has a step at time point 0.5 in FIG. 17a, there is no variation of the voltage at all. Thus, FIG. 17a shows that the current end voltage can be controlled independently on the basis of the equations (4.16), (4.17). FIG. 17c shows a typcial design example of the system in accordance with the invention.

SECOND EMBODIMENT

3-Phase System with Current PLL

Figure 18A:
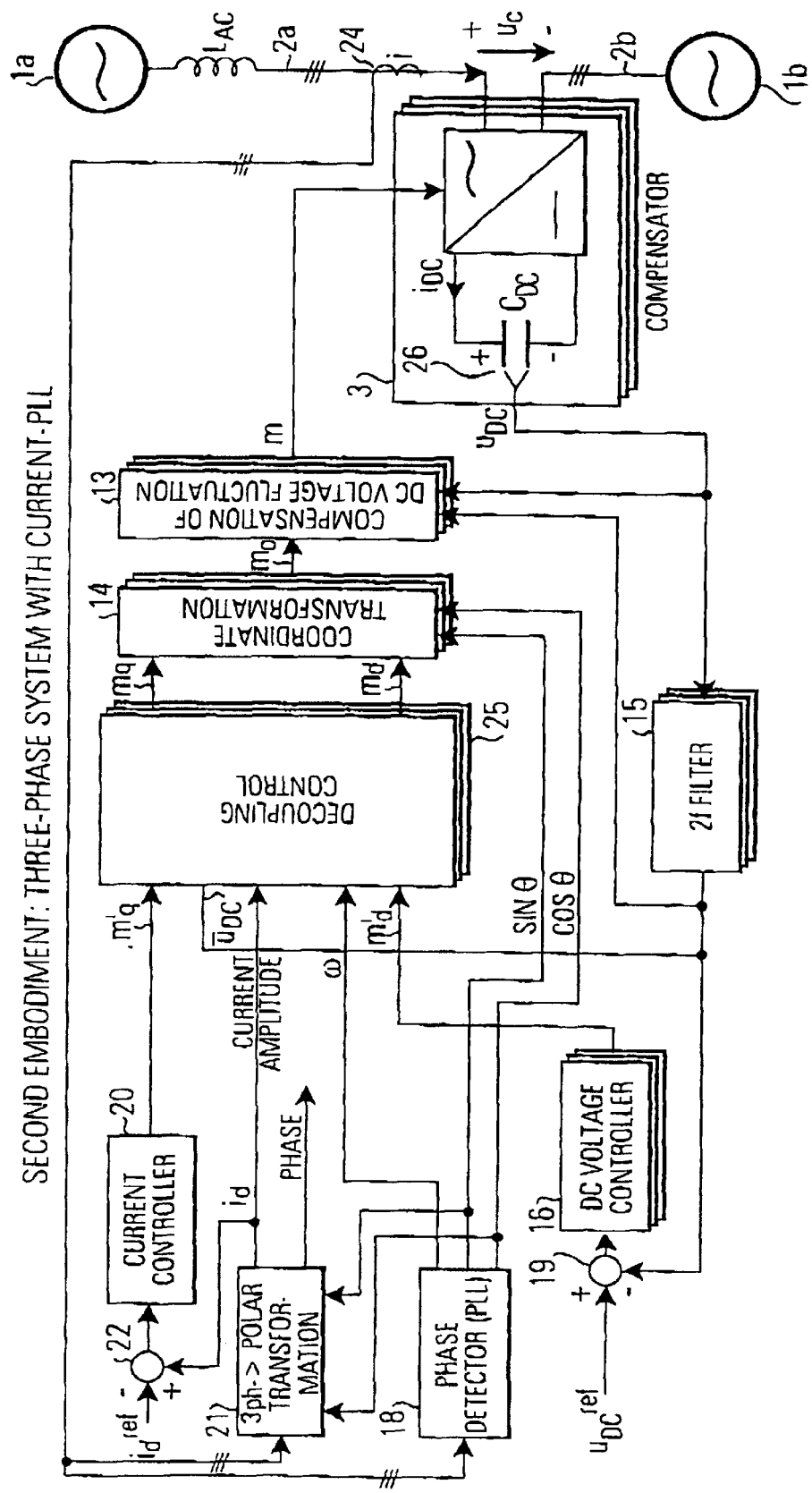
FIG. 18a shows a three-phase system as in FIG. 14 but using a current PLL for the line current phase detection, according to a second embodiment of the invention.

Whilst FIG. 14 together with FIG. 15 shows an embodiment of the invention comprising a three-phase system using a voltage PLL and an independent and local control, it is also possible to provide the three-phase system controller of FIG. 14 with a current PLL. In this case, the controller does not need a AC voltage detector 26 shown in FIG. 14. The configuration of the second embodiment is therefore constructed like FIG. 14 and omitting the voltage detector 23 and the phase rotation means 17 and connecting the output of the current detector 24 also to the phase detector 18 which now acts as a current PLL unit 18. The three-phase polar transformation unit 21 is the same as in FIG. 14 and the phase detector 18 directly outputs the sin θ and cos θ functions. As in the first embodiment. however, the system is still a three-phase system. The inputs $m'_q$, $u_{DC}$, $i_d$, ω, $m'_d$ to the decoupling control 25 are the same as in FIG. 14 and thus also the block diagramm in FIG. 15 for the decoupling control is applicable. Therefore, it should be understood that the embodiment in FIG. 18a operates—as far as the decoupling control is concerned—in exactly the same manner as the embodiment in FIG. 14.

THIRD EMBODIMENT

Single-Phase System with Current PLL

Figure 8:
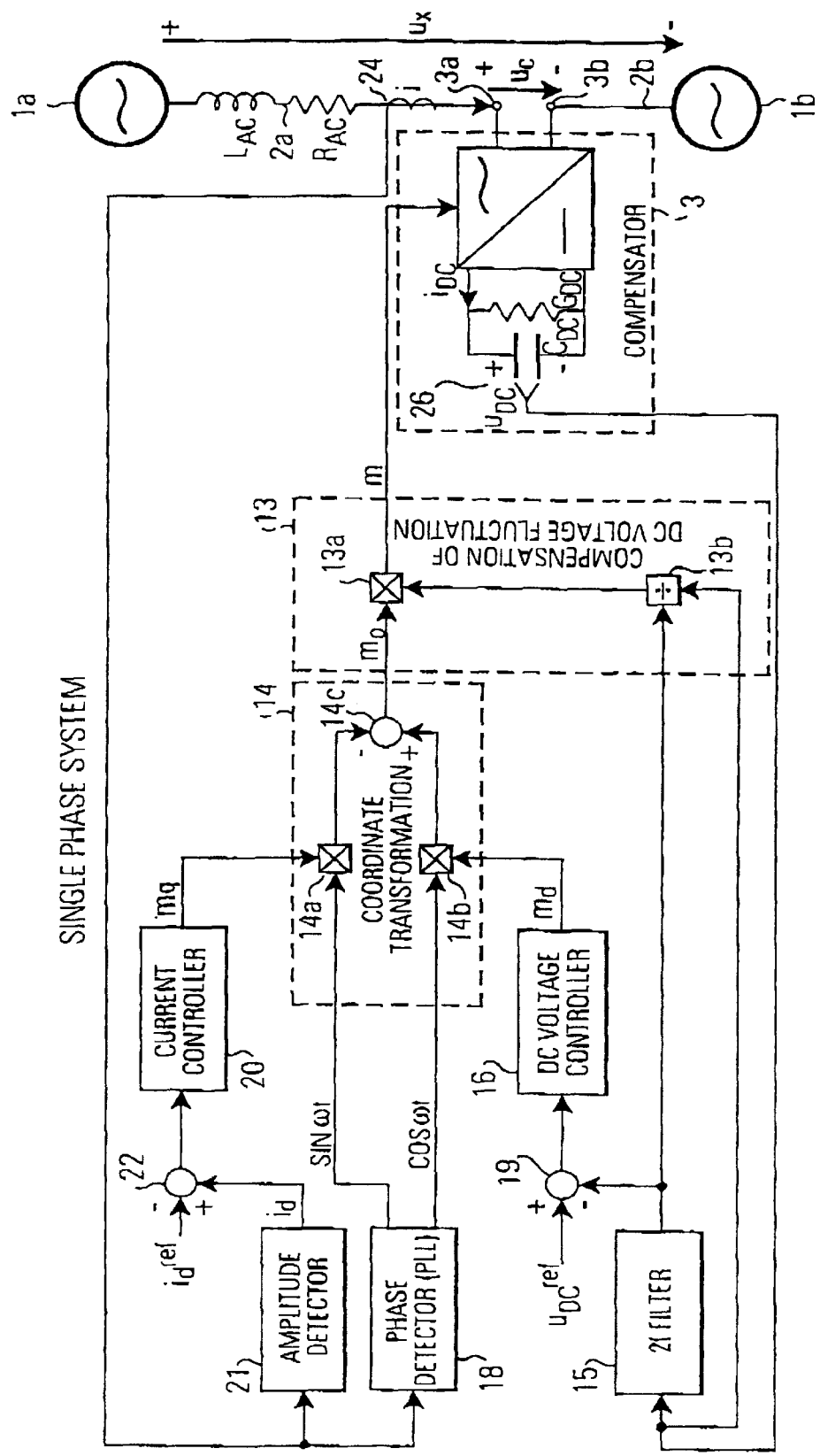
FIG. 8 shows a conventional single-phase controller.
Figure 16B:
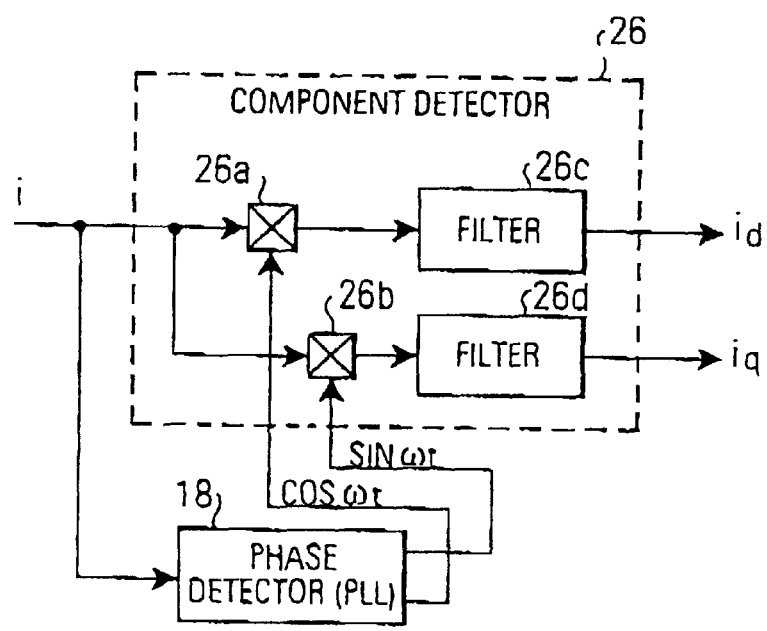
FIG. 16b shows a component detector according to one embodiment of the invention.
Figure 16A:
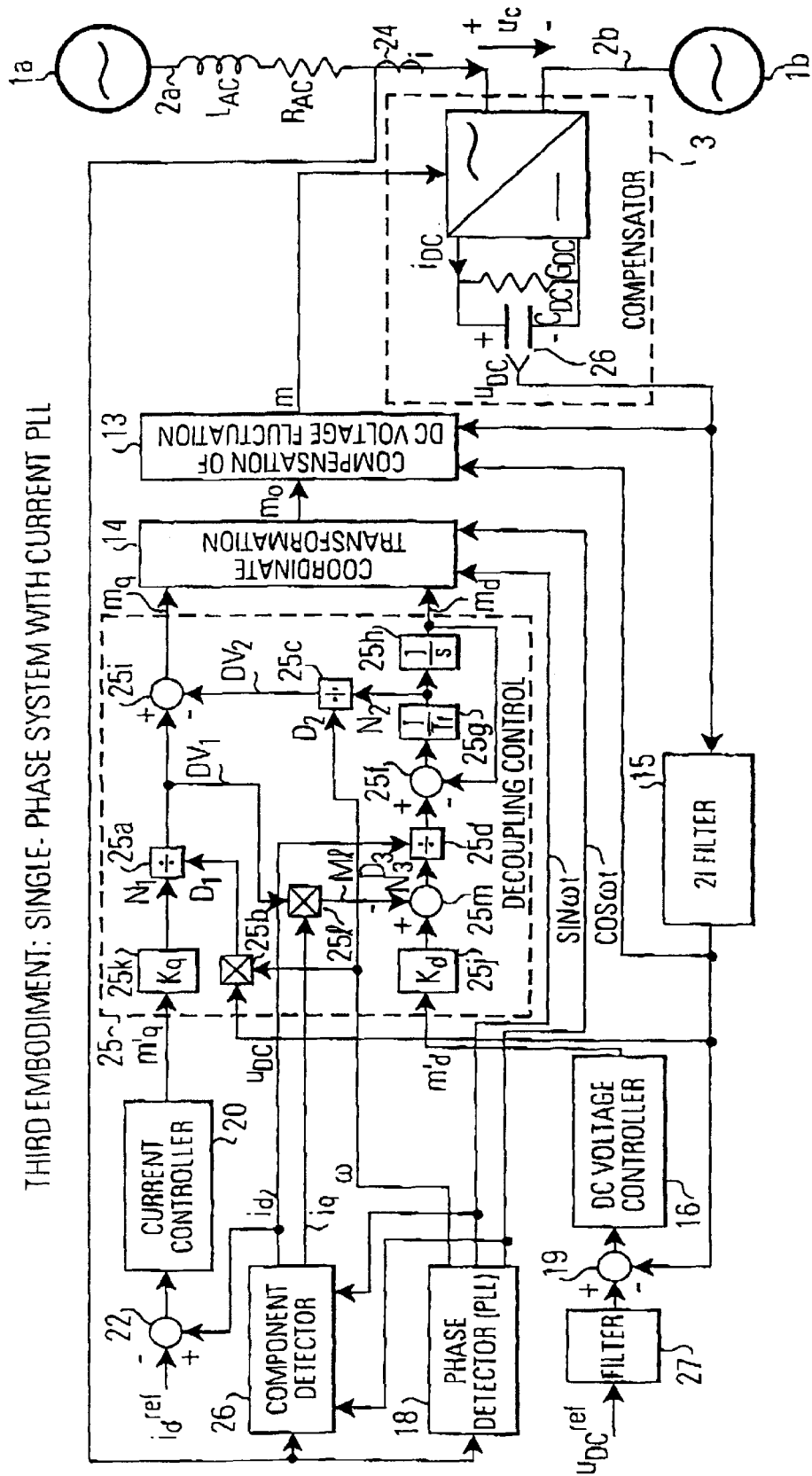
FIG. 16a shows a block diagram of a single phase controller according to the third embodiment of the invention.

FIG. 16a shows a single phase system having the basic construction of FIG. 8 and having a decoupling control means 25 and a component detector 26 according to a third embodiment of the invention. In this single phase system the current detection is also phase. Since the current detection is single phase, it is not possible to provide the q-axis component of the current $i_q$ to be zero by a reference frame detection. Therefore, in FIG. 16a the equations shown in FIG. 13c, namely equations (4.14), (4.15) are realized. In the single-phase system a single phase to d-q coordinate transformation of the current is needed (see FIG. 16b) in order to provide the $i_d$ and $i_q$ components needed in the decoupling control means 25 as shown in FIG. 16a.

The decoupling control means 25 according to the third embodiment of the invention comprises, in addition to the units 25a–25k an additional multiplier 25l and an additional adder 25m. The multiplier 25l multiplies the q-axis current component $i_q$ with the output of the first divider 25a and feeds a multiplied output ML to the negative input of the adder 25m. The adder 25m subtracts $i_q * DV_1$ (i.e. $i_q * m_q' K_q / u_{DC} \omega$ from $m_d' K_d$). The output of the adder 25b forms the nominator signal $M_3$ of the third divider 25d. With such a configuration the full equations (4.14), (4.15) can be realized.

Whilst in the three-phase system with symmetrical operation instantaneous current components can be measured easily, in a single phase or unbalanced three-phase system, on the contrary some time delay is unavoidable for the measurement. There are several ways to detect these components of single phase current. One simple example is shown in FIG. 16b. The AC line current i detected by the current detector 24 is multiplied by the sinusoidal reference signals cos ($\omega$t) and sin ($\omega$t) which are produced by the phase detector 18. The component detector 26 comprises a first and second multiplier 26a, 26b for multiplying the detected line current i with the signals sin ($\omega$t) and cos ($\omega$t) to produce the orthogonal current components $i_d$, $i_q$. Due to the multiplication there are also components of twice the line frequency $\omega$ and filters 26c, 26d are used to only pass the fundamental frequency $\omega$. It should be noticed that the reference signal cos ($\omega$t) is a signal in-phase to the AC current, and therefore icos $\omega$t and isin $\omega$t include the amplitude of the AC current $i_d$ and the transient component $i_q$, respectively.

FOURTH EMBODIMENT

Single-Phase System with Voltage PLL

It should be noted that in the third embodiment the current PLL is used for the current phase detection in the single-phase system. However, of course it is possible to use the voltage PLL in the single-phase system as explained above for the three-phase system as explained above. A single-phase system using a voltage PLL instead of the current PLL is shown in FIG. 18b.

Figure 18B:
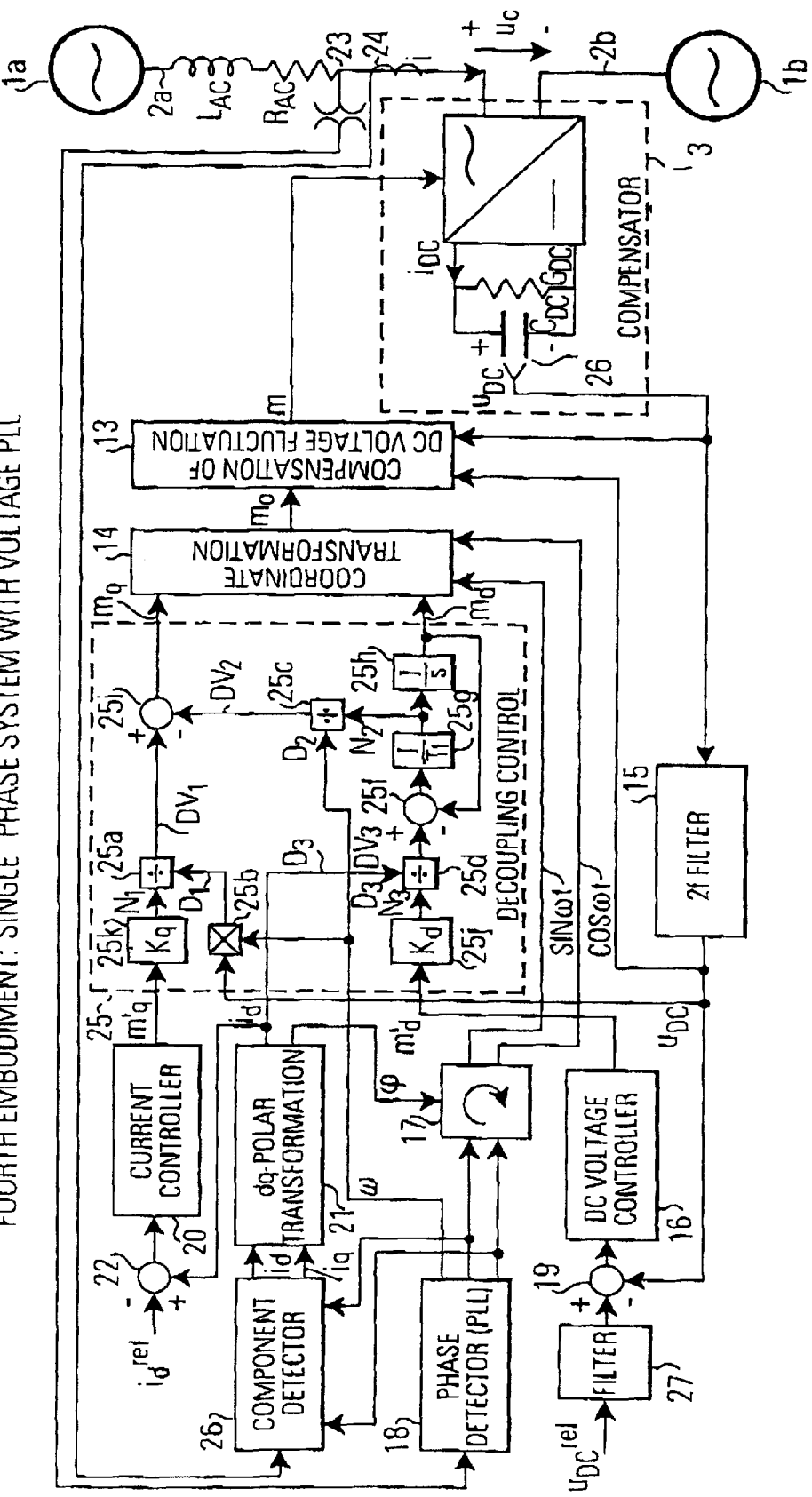
FIG. 18b shows a single-phase system as in FIG. 16a but using a voltage PLL for the line current phase detection, according to a fourth embodiment of the invention.

As shown in FIG. 18b, the component detector 26 outputs the $i_d$ and $i_q$ components. The 3-phase-polar transformation unit 21, the phase detector 18 and the phase rotation unit 17 correspond to those units already described with reference to FIG. 14. It is interesting to note that the decoupling control of the single-phase system with the voltage PLL version can be simplified just like in the case of the three-phase system with voltage PLL in FIG. 14 and FIG. 15. Because there is employed a phase correction from the voltage phase to the current phase this control makes the decoupling just a simple as in FIG. 15. Of course, by contrast to FIG. 14, there is an additional delay in the control loop because of the component detection in the component detector 26. However, the decoupling control 25 operates with the corrected reference frame in which the q-component of the current is made zero.

FIFTH EMBODIMENT

Additional Filters

As already indicated in FIG. 16a, a further filter 27 can be used for filtering the input reference voltage $u_{DC}^{ref}$. Such a filter 27 can also be used in each of the first, second and third and fourth embodiments as illustrated in FIGS. 14–18 and explained above.

The filter has the effect of reducing the amplitude of the modulation index and thus a decoupling control is achieved with a restricted output voltage capacity. Since the high frequency components of the input reference voltage are reduced by the filter, these components are not transferred to the decoupling control units. As a result, the output of the gain unit 25g will be reduced. This means, if the gain of the DC voltage controller is low and/or the input reference voltage is slow, the decoupling control unit DV2 can be neglected.

FURTHER EMBODIMENTS

Three Phase and Single Phase

As explained above, according to the present invention a decoupling control means is applied to two different systems, namely a single phase or a three phase system. Furthermore, essentially two different phase detection means (with voltage detector PLL and without voltage detector) can be used. Furthermore, a filter can optionally be used. Moreover, in the three-phase system it is easy to keep $i_q=0$ as explained above. However, since it is difficult to ensure $i_q=0$ in a single phase system because of the detection delay in transient, a different internal structure of the decoupling control means is employed (as shown in FIG. 16a for the single phase system).

In the three-phase system according to the first embodiment a voltage PLL is used because the usage of the voltage PLL is generally known. The second embodiment has no voltage PLL and its advantage is a reduction of components. Furthermore, in a single-phase system, the third embodiment uses no voltage PLL to illustrate simply the application of the invention in a single phase system. However, it should be understood that also the single phase system can operate with the voltage PLL and the voltage detector as shown in FIG. 18b according to the fourth embodiment. The additional filter according to the fifth embodiment can be used in any of the other embodiments. Of course the embodiments can be combined. Finally, it should be noted that the 2f filter and the DC voltage fluctuation compensation means are optional units as explained above.

INDUSTRIAL APPLICABILITY

As explained above, the present invention is based on a decoupling control by approximating the non-linear differential equations of the current and voltage loop. Thus, an independent voltage and current control can be achieved. Such a decoupling means can be used for a controller in a single phase system or a three-phase system for controlling compensators, preferably transformerless reactive series compensators. It should be noted that the invention is not restriced to the control of transformerless reactive series compensators and that equally well the control can be applied to compensators which indeed comprise a transformer. Even in such devices there is a need for controlling the compensator output voltage and the current and a representation of the line voltage as detected by the DC capacitor in the transformerless reactive series compensator will be available. Therefore, all controls described above can also be applied compensators having transformers.

However, it should be understood that the teachings and descriptions herein only relate to a preferred mode of operation and that further embodiments are possible on the basis of the teachings disclosed herein. Therefore, a skilled person can perform further modifications and variations on the basis of the above teachings. Furthermore, the invention can comprise embodiments which are based on features which have been independently described in the description and claimed in the claims. Therefore, all such variations and modifications are construed to fall under the scope of the attached claims.

What is claimed is:

1. A controller for controlling a reactive series compensator inserted into a power transmission line comprising:
    line current detection means for detecting a line current flowing in a power transmission line;
    DC voltage detection means for detecting a DC voltage of a capacitor connected to a modulator of an inverter of a reactive series compensator;
    modulation signal generation means for generating an inverter modulation signal m=$m_d$ cos (ωt)−$m_q$ sin (wt), where ω is a line frequency to be supplied as a modulation signal to the modulator of the compensator;
    a current loop for controlling the line current to a reference current, a current controller of the current control loop outputting a modulation index $m_q'$ for the modulation signal;
    a voltage control loop for controlling the DC voltage of the capacitor to a reference voltage, a DC voltage controller of the voltage control loop outputting a modulation index $m_d'$ or the modulation signal; and
    decoupling control means receiving the modulation index $m_q'$ from the current controller and the modulation index $m_d'$ of the DC voltage controller and outputting new modulation indices $m_q$ and $m_d$ to the modulation signal generation means so that the line current is independent of $m_d'$ and the DC voltage of the capacitor is independent of $m_q'$, whereby an AC current amplitude and the DC voltage of the capacitor are controlled independently.

2. The controller according to claim 1, wherein the current control loop comprises a current subtractor for subtracting an active current amplitude of the line current from the reference current to produce a difference current and for outputting the difference current to the current controller.

3. The controller according to claim 2, wherein the voltage control loop comprises a current subtractor for subtracting the DC voltage of the capacitor from the reference voltage to produce a difference voltage and for outputting the difference voltage to the DC voltage controller.

4. The controller according to claim 3, wherein the modulation signal generation means comprises coordinate transformation means receiving a first reference signal (sin (ωt)), a second reference signal (cos (ωt)), and the modulation indexes $m_q'$ and $m_d'$, and for outputting the modulation signal.

5. The controller according to claim 4, wherein the power transmission line is a three-phase system having three phases, and the compensator, the DC voltage controller, the decoupling means, and the modulation signal m are provided for each of the three phases and a single current controller is provided.

6. The controller according to claim 5, comprising:
    a voltage detector for detecting the line voltage of each phase;
    a voltage phased locked loop (PLL) detector unit for receiving the line voltage from the voltage detector and for outputting a third reference signal sin ωt and a fourth reference signal cos ωt, each of the third and fourth reference signals being synchronized to the phase of the line voltage and the line frequency;
    phase rotation means for receiving the third and fourth reference signals and a phase signal and for generating the first and second reference signals to be supplied to the coordinate transformation means; and
    a three-phase polar transformation unit receiving a line current for each phase and for outputting an active current amplitude to the current subtractor and the decoupling means, and the phase signal to the phase rotation means.

7. The controller according to claim 5, comprising:
    a current phased locked loop (PLL) detector unit receiving the line current (i) from the line current detection means and for outputting as the first reference signal sin ωt, and as the second reference signal cos ωt, each of the first and second reference signals being synchronized to the phase of the line current and the line frequency, to the decoupling means; and
    a component detector for receiving the line current and for outputting an active current amplitude to the current subtractor and the decoupling means, and a reactive current amplitude to the decoupling means.

8. The controller according to claim 4, wherein the power transmission line is a single-phase system, and consisting of a single compensator, the DC voltage controller, the decoupling means, the coordinate transformation means, and the current controller.

9. The controller according to claim 8, comprising:
    a current phased locked loop (PLL) detector unit receiving the line current (i) from the line current detection means and for outputting as the first reference signal sin ωt, and as the second reference signal cos ωt, each of the first and second reference signals being synchronized to the phase of the line current and the line frequency, to the decoupling means; and
    a component detector for receiving the line current and for outputting an active current amplitude to the current subtractor and the decoupling means, and a reactive current amplitude to the decoupling means.

10. The controller according to claim 9, wherein the decoupling control means comprises:
    a first multiplier for multiplying the DC voltage of the capacitor and the line frequency output by the current PLL detector unit to produce a first product;
    a first divider for dividing from the current by the first product output by the first multiplier to produce a first dividend;
    a second multiplier for multiplying the reactive current amplitude output by the component detector by the first dividend produced by the first divider to produce a second product;
    a first adder for subtracting the second product from $m_q'*K_d$ to produce a first sum;
    a second divider for dividing the first sum by the active component amplitude output by the component detector to produce a second dividend;
    derivation means comprising a second adder receiving the second dividend and an output of an integrator to produce a second sum, a time lag unit receiving the second sum and feeding the second sum to an input of the integrator, wherein the integrator produces a modified modulation index, $m_d$;
    a third divider dividing the input of the integrator by the line frequency output by the current PLL detector unit to produce a third dividend; and
    a third adder for subtracting the third dividend from the first dividend, and the third adder (25i) outputting as a third sum a modified modulation index, $m_q$.

11. The controller according to claim 9, wherein the component detector comprises first and second multipliers for respectively multiplying the line current and the first and second reference signals (sin (ωt), cos (ωt)) and first and second filters for respectively passing a fundamental frequency output by the first and second multipliers, outputs of the first and second filters constituting the reactive current amplitude and the active current amplitude of the line current.

12. The controller according to claim 6, wherein each of the decoupling control means comprises:

a first multiplier for multiplying the DC voltage of the capacitor by the line frequency output by the current PLL detector unit to produce a first product;

a first divider for dividing the output ($m_q'$) of the current controller (20) by the first product to produce a first dividend;

a second divider for dividing the output ($m_d'$) of the DC voltage controller by the active current amplitude output by the three-phase-polar transformation unit to produce a second dividend;

derivation means comprising a first adder, a time lag unit, and an integrator, the first adder subtracting an output of the integrator from the second dividend to produce a first sum and outputting the first sum to the time lag unit, the time lag unit outputting a result as an input to the integrator, and the integrator outputting the modified modulation index, $m_d$;

a third divider for dividing the input to the integrator by the line frequency output by the phase detector to produce a third dividend; and a second adder for subtracting the third dividend from first dividend, the second adder outputting as the modified modulation index $m_q$ as a second sum.

13. The controller according to claim 4, wherein the modulation signal generation means further comprises voltage fluctuation compensation means receiving the modulation signal from the coordinate transformation means and outputting the modulation signal m to the inverter of the compensator wherein the voltage fluctuation compensation means reduces fluctuations in the modulation signal due to voltage fluctuations of the DC voltage of the capacitor.

14. The controller according to claim 4, wherein the coordinate transformation means comprises a first multiplier and a second multiplier respectively multiplying the output of the current $m_q'$ and the first reference signal (sin (ωt)) and the output $m_d'$ of the DC voltage controller and the second reference signal (cos (ωt)), and a subtractor for subtracting a multiplication result produced by the first multiplier from a multiplication result produced by the second multiplier.

15. The controller according to claim 13, wherein the voltage control loop further comprises a filter for filtering the DC voltage of the capacitor and the voltage fluctuation compensation means comprises a divider dividing an output of the filter by an input of the filter and a multiplier multiplying an output of the coordinate transformation means and an output of the divider, a multiplication result output by the multiplier being the modulation signal m fed to the inverter of the compensator.

16. The controller according to claim 5, including the filter and the voltage fluctuation compensation means for each of the phases.

17. The controller according to claim 8, consisting of one filter and one voltage fluctuation compensation means.

18. The controller according to claim 1, wherein the controller controls a transformerless reactive series capacitor.

19. The controller according to claim 1, wherein the controller controls a reactive series compensator having a transformer.

20. The controller according to claim 7, wherein the component detector comprises first and second multipliers for respectively multiplying the line current and the first and second reference signals (sin (ωt), cos (ωt)) and first and second filters for respectively passing a fundamental frequency output by the first and second multipliers, outputs of the first and second filters constituting the reactive current amplitude and the active current amplitude of the line current.

* * * * *